(12) United States Patent
Kimchi et al.

(10) Patent No.: US 10,078,136 B2
(45) Date of Patent: Sep. 18, 2018

(54) SENSE AND AVOID FOR AUTOMATED MOBILE VEHICLES

(71) Applicant: Amazon Technologies, Inc., Reno, NV (US)

(72) Inventors: Gur Kimchi, Bellevue, WA (US); Scott Isaacs, Bellevue, WA (US); Amir Navot, Seattle, WA (US); Brian C. Beckman, Newcastle, WA (US); Frederik Schaffalitzky, Kirkland, WA (US); Scott A. Green, North Bend, WA (US)

(73) Assignee: Amazon Technologies, Inc., Seattle, WA (US)

( * ) Notice: Subject to any disclaimer, the term of this patent is extended or adjusted under 35 U.S.C. 154(b) by 299 days.

(21) Appl. No.: 14/225,161

(22) Filed: Mar. 25, 2014

(65) Prior Publication Data
US 2015/0277440 A1 Oct. 1, 2015

(51) Int. Cl.
*G01S 17/08* (2006.01)
*G01S 17/93* (2006.01)
(Continued)

(52) U.S. Cl.
CPC ............ *G01S 17/08* (2013.01); *B64C 39/024* (2013.01); *G01S 17/933* (2013.01); *G05D 1/102* (2013.01);
(Continued)

(58) Field of Classification Search
CPC .............................. G01S 17/08; G01S 17/933
USPC .... 701/2, 26, 301, 3, 11, 300; 244/189–190, 244/23 A, 76 A, 75.1, 76, 1, 24, 63; 705/332, 330; 340/435; 180/168; 342/153; 356/72, 614, 4.01; 347/256, 347/260; 369/44.11; 720/658–660; 358/196.1–197
See application file for complete search history.

(56) References Cited

U.S. PATENT DOCUMENTS

| 4,817,000 A | 3/1989 | Eberhardt |
| 5,530,330 A | 6/1996 | Baiden et al. |

(Continued)

FOREIGN PATENT DOCUMENTS

| CN | 103274226 A | 9/2013 |
| WO | WO2012173632 A1 | 12/2012 |

OTHER PUBLICATIONS

Detecting other robots from range data for robust self-localization of autonomous mobile robots; Kimura, N. ; Fujimoto, K. ; Moriya, T. ; Furuno, H.; Tomioka, Y. ; Nagashima, Y. ; Yoshida, Y.; Intelligent and Advanced Systems (ICIAS), 2012 4th Inter. Conf. on; vol. 2; DOI: 10.1109/ICIAS.2012.6306095; Pub Year: 2012 , pp. 654-658.*

(Continued)

*Primary Examiner* — Cuong H Nguyen
(74) *Attorney, Agent, or Firm* — Athorus, PLLC

(57) ABSTRACT

This disclosure describes an automated mobile vehicle that includes one or more distance determining elements configured to detect the presence of objects and to cause the automated mobile vehicle to alter its path to avoid the object. For example, a distance determining element may be incorporated into one or more of the motors of the automated mobile vehicle and configured to determine a distance to an object. Based on the determined distance, a path of the automated mobile vehicle may be altered.

14 Claims, 13 Drawing Sheets

(51) Int. Cl.
| | |
|---|---|
| *G05D 1/10* | (2006.01) |
| *G08G 5/00* | (2006.01) |
| *G08G 5/04* | (2006.01) |
| *B64C 39/02* | (2006.01) |
| *G01S 13/08* | (2006.01) |
| *G01S 15/08* | (2006.01) |

(52) U.S. Cl.
CPC ......... *G08G 5/0008* (2013.01); *G08G 5/0013* (2013.01); *G08G 5/0021* (2013.01); *G08G 5/0052* (2013.01); *G08G 5/0069* (2013.01); *G08G 5/0078* (2013.01); *G08G 5/0086* (2013.01); *G08G 5/045* (2013.01); *B64C 2201/027* (2013.01); *B64C 2201/042* (2013.01); *B64C 2201/108* (2013.01); *B64C 2201/128* (2013.01); *B64C 2201/141* (2013.01); *G01S 13/08* (2013.01); *G01S 15/08* (2013.01)

(56) References Cited

U.S. PATENT DOCUMENTS

| | | | |
|---|---|---|---|
| 6,163,745 | A | 12/2000 | Purchase et al. |
| 6,366,345 | B1 | 4/2002 | Yamabuchi |
| 6,470,989 | B1 | 10/2002 | Puputti et al. |
| 6,975,246 | B1* | 12/2005 | Trudeau ................. 340/903 |
| 7,333,128 | B2 | 2/2008 | Yoon |
| 7,392,151 | B2 | 6/2008 | Makela |
| 7,725,232 | B2 | 5/2010 | Makela et al. |
| 7,899,599 | B2 | 3/2011 | Makela et al. |
| 8,070,090 | B2 | 12/2011 | Tayman |
| 8,205,822 | B1* | 6/2012 | Jameson et al. .......... 244/17.11 |
| 8,565,913 | B2 | 10/2013 | Emanuel et al. |
| 8,688,598 | B1 | 4/2014 | Shakes et al. |
| 8,948,935 | B1* | 2/2015 | Peeters et al. ................... 701/3 |
| 9,487,356 | B1* | 11/2016 | Aggarwal ............ B65G 1/1373 |
| 9,714,139 | B1* | 7/2017 | Aggarwal ................ B65G 1/16 |
| 2008/0125224 | A1* | 5/2008 | Pollatsek ....................... 463/36 |
| 2008/0180691 | A1* | 7/2008 | Hays ...................... G01N 21/47 356/519 |
| 2009/0152391 | A1* | 6/2009 | McWhirk ................. B64B 1/02 244/30 |
| 2009/0320609 | A1* | 12/2009 | Xia ....................... G01H 9/004 73/862.08 |
| 2010/0208247 | A1* | 8/2010 | Bosselmann ........... F03D 17/00 356/237.1 |
| 2011/0288696 | A1* | 11/2011 | Lefebure ........................... 701/2 |
| 2011/0288794 | A1* | 11/2011 | Chen ....................... G01F 1/065 702/45 |
| 2012/0056040 | A1* | 3/2012 | Brotherton-Ratcliffe et al. ......... 244/23 A |
| 2012/0191272 | A1 | 7/2012 | Andersen et al. |
| 2013/0342822 | A1 | 12/2013 | Shiraishi |
| 2014/0008496 | A1* | 1/2014 | Ye et al. ........................ 244/190 |
| 2014/0032021 | A1 | 1/2014 | Metzler et al. |
| 2014/0136414 | A1* | 5/2014 | Abhyanker ..................... 705/44 |
| 2014/0144376 | A1* | 5/2014 | Burke ................. G05D 1/0244 118/323 |
| 2014/0146309 | A1* | 5/2014 | Burke ................. G01B 11/002 356/72 |
| 2014/0180914 | A1* | 6/2014 | Abhyanker .............. G01C 1/00 705/39 |
| 2015/0277440 | A1* | 10/2015 | Kimchi ................... G01S 17/08 701/26 |
| 2016/0299228 | A1* | 10/2016 | Maleki .................. G01S 17/325 |
| 2016/0371984 | A1* | 12/2016 | Macfarlane ............ G01C 21/20 |

OTHER PUBLICATIONS

A fiber-optic nerve stimulation probe integrated with a precise common-path optical coherence tomography distance sensor Kang Zhang ; Katz, E. ; Do-Hyun Kim ; Kang, J.U. ; Ilev, I.K.; Lasers and Electro-Optics (CLEO) and Quantum Electronics and Laser Science Conference (QELS), 2010 Conference on; Publication Year: 2010 , pp. 1-2.*

Impact of package delivery rate on the safety of highway vehicle platoons; Lijian Xu ; Le Yi Wang ; Yin, G. ; Hongwei Zhang ; Jin Guo; Intelligent Vehicles Symposium Proceedings, 2014 IEEE; DOI: 10.1109/IVS.2014.6856395; Publication Year: 2014 , pp. 974-979.*

Optimal angular movement of laser beam in SPR using an embedded controller; Rajavelan, M.; Ananthi, S.; Padmanabhan, K. Emerging Trends in VLSI, Embedded System, Nano Electronics and Telecommunication System (ICEVENT), 2013 International Conference on; Year: 2013; pp. 1-4, DOI: 10.1109/ICEVENT.2013.6496534.*

Experimental verification and characterization of sub-harmonic traveling wave on an ultrasonic micromotor; Tin, S.; Pandey, M.; Lal, A.; Ultrasonics Symposium (IUS), 2010 IEEE; Year: 2010; pp. 1841-1844, DOI: 10.1109/ULTSYM2010.5935569.*

Design of 18 krpm rated speed SMPM synchronous machine for "wobble" laser welding; Castellini, L.; Carmignano, M.; D'Andrea, M.; Power Electronics, Electrical Drives, Automation and Motion (SPEEDAM), 2014 International Symposium on; Year: 2014 pp. 391-396, DOI: 10.1109/SPEEDAM.2014.6871973.*

Tracking laser radar for 3-D shape measurements of large industrial objects based on time-of-flight laser rangefinding and position-sensitive detection techniques; Makynen, A.J.; Kostamovaara, Juha T.; Myllyla, R.A. ; Instrumentation and Measurement, IEEE Transactions on; Year: 1994, vol. 43, Issue: 1; pp. 40-49, DOI: 10.1109/19.286353.*

Laser beam deflection polygon scanner using HTS bearings; Werfel, F.N.; Floegel-Delor, U.; Rothfeld, R.; Wippich, D.; Riedel, T. ; Applied Superconductivity, IEEE Transactions on; Year: 2001, vol. 11, Issue: ; pp. 1737-1740, DOI: 10.1109/77.920119.*

Sensor fusion-based line detection for unmanned navigation; Changmook Chun et al.; 2010 IEEE Intelligent Vehicles Symposium Year: 2010; pp. 191-196.*

Real-Time Phase-Stamp Range Finder Using Correlation Image Sensor; Akira Kimachi; Shigeru Ando; IEEE Sensors Journal Year: 2009, vol. 9, Issue: 12; pp. 1784-1792.*

First shipborne GNSS-R campaign for receiving low elevation angle sea surface reflected signals Junming Xia et al., 2016 IEEE International Geoscience and Remote Sensing International Geoscience and Remote Sensing Symposium (IGARSS); Year: 2016; pp. 5613-5616.*

Aerosight, "We Can Make Almost Anything Fly! DomiCopter Case Study", "http://www.aerosight.co.uk/bespoke-projects/", 2013, Publisher: Aerosight UAV Ltd.

Angus MacKenzie, "Domino's DomiCopter Takes Pizza Delivery Airborne", "http://www.gizmag.com/dominos-domicopter-pizza-delivery/27814/", Jun. 6, 2013.

Dezeen, "World's First Drone Delivery Service Launches in Australia", "http://vimeo.com/76965171", 2014, Publisher: Vimeo, LLC.

Shanghalist China, "InCake UFO Delivery Service", "http://e.weibo.com/incake", Jul. 23, 2013.

Gwynn Guilford Quartz, "Australia and China are Beating Amazon in the Commercial Drone Race", "http://www.nextgov.com/emerging-tech/2013/12/australia-and-china-are-beating-amazon", Dec. 2, 2013, Publisher: Nextgov.

Connor Adams Sheets, "China Beat Amazon Prime Air to the Commercial Drone Delivery Market", "http://www.ibtimes.com/china-beat-amazon-prime-air-commercial-drone-delivery-market", Dec. 2, 2013.

Tacocopter, Inc., "Flying Robots Deliver Tacos to Your Location, Easy Ordering on Your Smartphone", "http://tacocopter.com/", Jan. 29, 2014.

U.S. Appl. No. 61/896,065, filed Oct. 26, 2013, Daniel Buchmueller et al., "Automated Aerial Delivery Vehicle."

U.S. Appl. No. 61/901,431, filed Nov. 7, 2013, Daniel Buchmueller et al., "Automated Aerial Delivery Vehicle Routing and Safety."

(56) References Cited

OTHER PUBLICATIONS

Velazco, C., "Amazon is Experimenting with Autonomous Flying Delivery Drones", "http://techcrunch.com/2013/12/01/amazon-is-experimenting-with-autonomous-flying-delivery-drones," Dec. 1, 2013, Publisher: TechCrunch.com.
International Search Report for PCT Application No. PCT/US2015/021477 dated Jun. 29, 2015.
Partial Supplementary European Search Report for EP Application No. 15768164.4 dated Nov. 14, 2017, 12 pages.
Extended European Search Report for EP Application No. 15768164.4, dated Mar. 27, 2018, 14 pages.
Urmson et al, "Autonomous Driving in Urban Environments: Boss and the Urban Challenge," Journal of Field Robotics, vol. 25, No. 8, Aug. 1, 2008.

\* cited by examiner

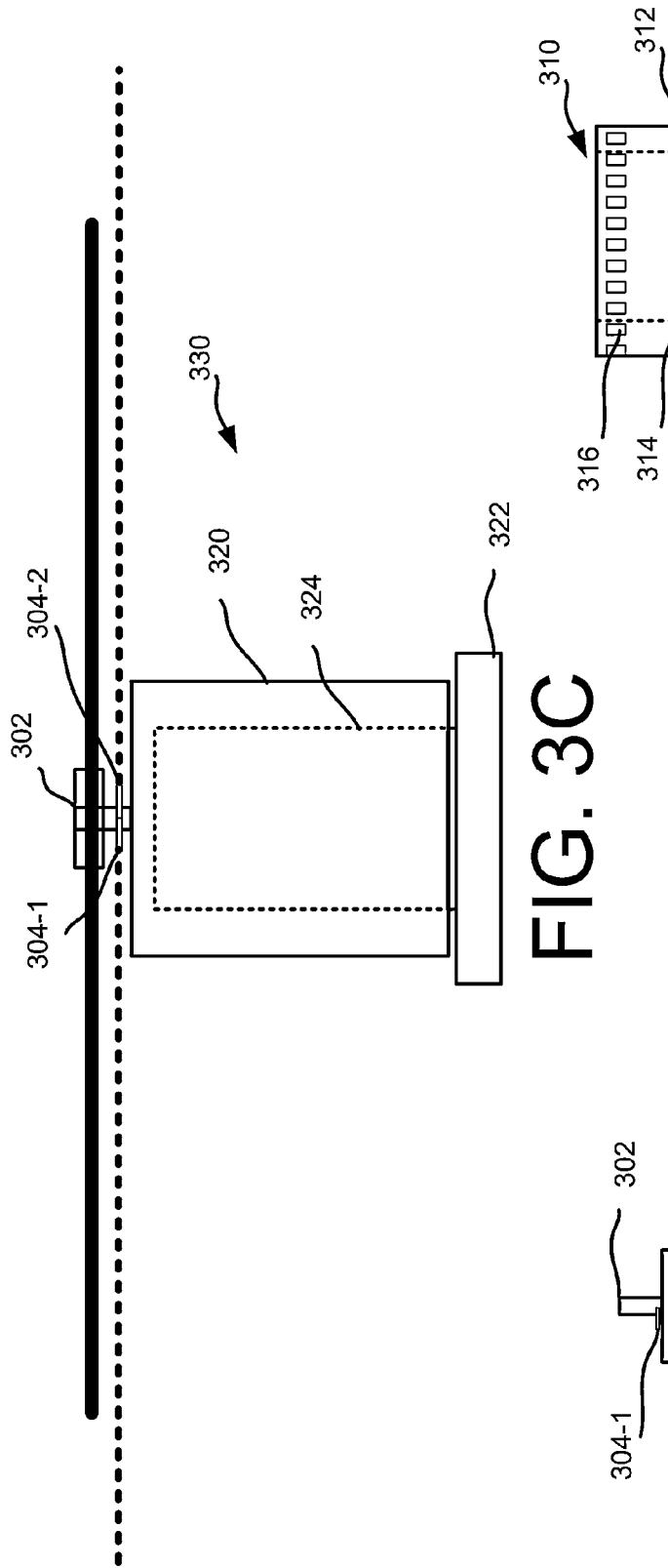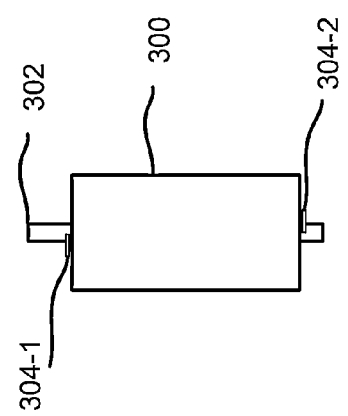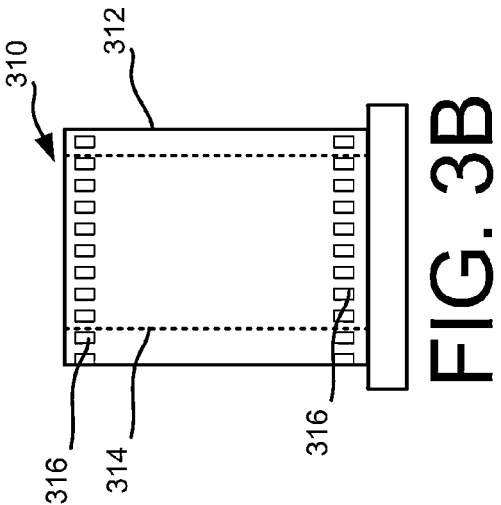

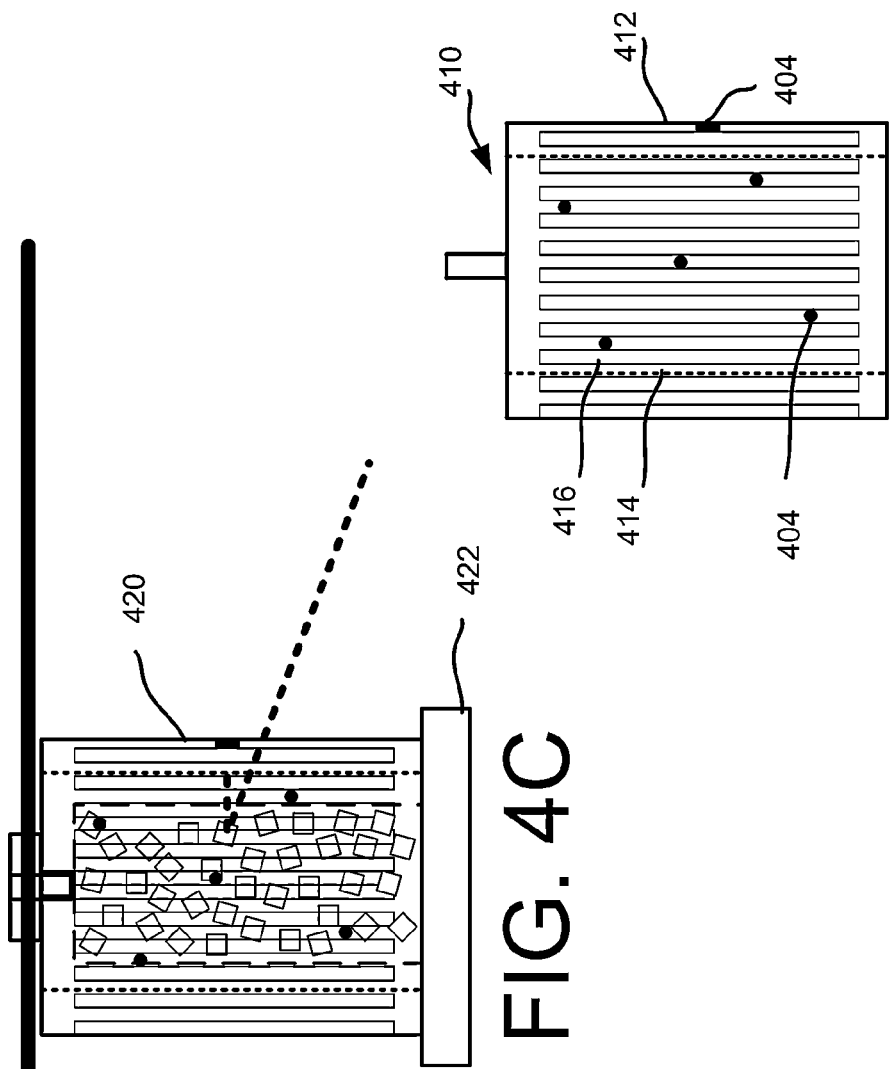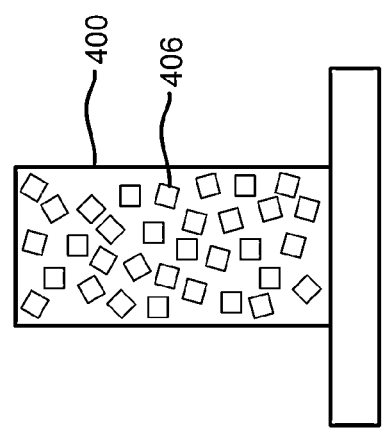

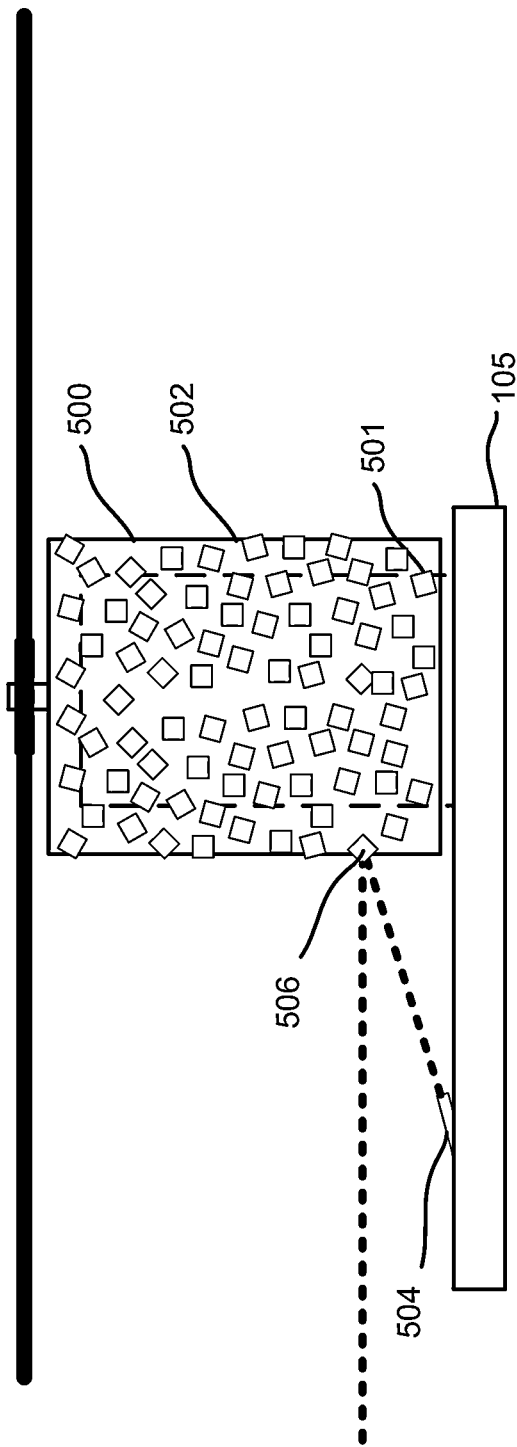

ed in a permissive sense (i.e., meaning having the potential to), rather than the mandatory sense (i.e., meaning must). Similarly, the words "include," "including," and "includes" mean including, but not limited to.

SENSE AND AVOID FOR AUTOMATED MOBILE VEHICLES

BACKGROUND

Automated mobile vehicles, such as aerial, ground and water based automated vehicles are continuing to increase in use. For example, unmanned aerial vehicles (UAVs) are often used for surveillance. Likewise, mobile drive units, such as those provided by Kiva Systems, Inc., are often used in materials handling facilities to autonomously transport inventory within the facility. While there are many beneficial uses of these vehicles, they also have many drawbacks. For example, UAVs require human involvement to ensure that the vehicles do not collide with other UAVs or other objects.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 3A-3C depict block diagrams of a motor assembly of an automated mobile vehicle illustrated in FIG. 1 or 2, according to an implementation.

FIGS. 4A-4C depict block diagrams of a motor assembly of an automated mobile vehicle illustrated in FIG. 1 or 2, according to an implementation.

FIG. 5 depicts a block diagram of a motor assembly of an automated mobile vehicle illustrated in FIG. 1 or 2, according to an implementation.

Figure 1:
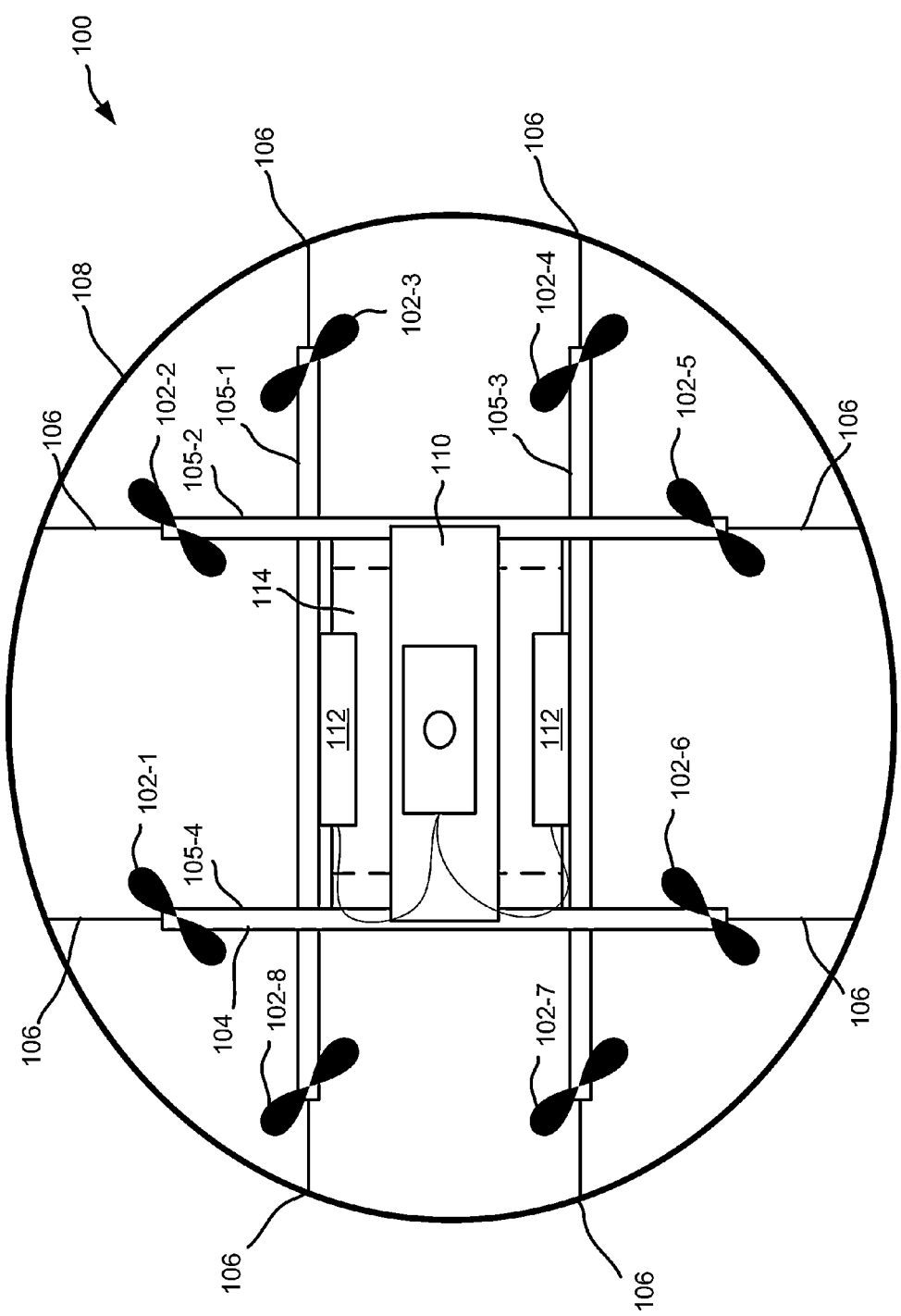
FIG. 1 depicts a block diagram of a top-down view of an automated mobile vehicle, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes an automated mobile vehicle ("AMV") and system for automatically sensing and avoiding objects. As discussed in further detail below, in some implementations, the AMV may include multiple rangefinders mounted at various locations on the AMV that can be used to determine a distance between an object and the AMV. In some implementations, the rangefinders may be, for example, laser based range finders that are fixedly mounted to the AMV and configured to emit a laser signal that projects out and reflects off an object that intersects the path of the laser signal. The reflected laser signal is received by the rangefinder and the duration of time between emission and receipt of the laser signal after it reflects off an object (referred to herein as "time-of-flight" or "ToF") is used to determine the distance between the object and the AMV.

To further increase the ability to detect objects in a proximity of the AMV, the AMV may rotate or otherwise alter the pitch, roll, and/or yaw of the AMV while it is moving. By altering one or more of the pitch, roll, and/or yaw while the AMV is moving, the laser signals emitted from the rangefinders will be projected in different directions, thereby reflecting off objects at different positions with respect to the AMV. For example, in some implementations, an AMV may be configured to include a laser based rangefinder fixedly mounted to the AMV such that the emitted laser signal projects in a direction that is horizontal with the body of the AMV and perpendicular with the front end of the AVM. By altering the yaw of the AMV such that it rotates 360 degrees, the laser based range finder will emit the laser signal such that, due to the rotation of the AMV, it projects around a plane of the AMV, detecting any objects around the AMV. Likewise, as discussed further below, by altering the pitch of the AMV while the AMV is moving, the laser based range finder will emit the laser signal such that the projection will cover a vertically oriented plane in front of the AMV. By combining the alteration of both yaw and pitch, a larger area around, above and below the AMV can be covered by a single laser based range finder mounted to the AMV.

In some implementations, rather than fixedly mounting the rangefinder(s) to the AMV, the rangefinders may be incorporated into one or more of the motors of the AMV. For example, if the AMV is propelled using brushless motors, a laser based rangefinder may be mounted to a component of the brushless motor (e.g., rotor, stator) and configured to emit a laser signal that projects from the motor. Rather than, or in addition to, altering the yaw of the AMV to create a plane about which the laser signal is projected, by incorporating the rangefinder into the motor, the rangefinder may rotate with the spinning of the motor components, thereby causing the emitted laser signal to project in a plane around the motor. For example, if the laser is mounted onto the rotor of the motor and the motor is configured such that the emitted laser signal will project out of and reflect into the motor (e.g., through slots in the stator) as the rotor rotates, the emitted laser signal will be projected in a 360 degree plane around the motor and can detect and determine the distance to objects that intersect that plane.

In still further implementations, by including multiple rangefinders on the AMV at various locations (e.g., one in each motor), the AMV can determine its relative position with respect to an object. For example, if the AMV includes three rangefinders that are configured to detect objects that intersect a 360 plane of the laser signal projected from the respective rangefinder, each rangefinder may determine a distance to a detected object based on the ToF of the projected laser signals. Because the rangefinders are at different locations on the AMV, the distance to the identified object will be different for each rangefinder. These differences can be used to determine the relative position, distance and orientation of the AMV, with respect to the object.

In still further implementations, fixed position transmitters may be located at known positions (e.g., materials handling facilities, gas stations, landing areas, cell towers) that transmit fixed position information (e.g., geographic coordinates) associated with that fixed position transmitter. The AMV may receive position information from the fixed position transmitters and, if position information is received from at least three fixed position transmitters, the AMV can determine its absolute position (e.g., geographic coordinates) and the absolute position of the detected object.

In some implementations, the AMV will communicate with other AMVs in the area to provide and/or receive information, such as AMV identification, current position, altitude, and/or velocity. For example, AMVs may be configured to support automatic dependent surveillance-broadcast (ADS-B) and both receive and/or transmit identification, current position, altitude, and velocity information. This information may be stored in a central location and/or dynamically shared between nearby AMVs, materials handling facilities, relay locations, the AMV management system and/or locations. For example, other AMVs may provide ADS-B information and/or additional information regarding weather (e.g., wind, snow, rain), landing conditions, traffic, etc. The receiving AMV may utilize this information to plan the route/flight path from a source location to a destination location and/or to modify the actual navigation of the route. In addition, in some implementations, the AMV may consider other environmental factors while navigating a route. For example, if the AMV's route must cross over a road built for automobiles, the navigation of the route may be adjusted to minimize the intersection between the AMV's flight path and the road. For example, the AMV may alter its navigation such that the flight path of the AMV will intersect with the automobile road at an approximately perpendicular angle.

While the examples discussed herein primarily focus on AMVs in the form of an aerial vehicle utilizing multiple propellers to achieve flight (e.g., a quad-copter or octo-copter), it will be appreciated that the implementations discussed herein may be used with other forms of AMVs.

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more inventory items may be delivered. For example, the delivery location may be a person's residence, a place of business, a location within a materials handling facility (e.g., packing station, inventory storage), any location where a user or inventory is located, etc. Inventory or items may be any physical goods that can be transported using an AMV.

A "relay location," as used herein, may include, but is not limited to, a delivery location, a materials handling facility, a cellular tower, a rooftop of a building, a delivery location, or any other location where an AMV can land, charge, retrieve inventory, replace batteries, and/or receive service.

FIG. 1 illustrates a block diagram of a top-down view of an AMV 100, according to an implementation. As illustrated, the AMV 100 includes eight propellers 102-1, 102-2, 102-3, 102-4, 102-5, 102-6, 102-7, 102-8 spaced about the frame 104 of the AMV. The propellers 102 may be any form of propeller (e.g., graphite, carbon fiber) and of a size sufficient to lift the AMV 100 and any inventory engaged by the AMV 100 so that the AMV 100 can navigate through the air, for example, to deliver an inventory item to a location. While this example includes eight propellers, in other implementations, more or fewer propellers may be utilized. Likewise, in some implementations, the propellers may be positioned at different locations on the AMV 100. In addition, alternative methods of propulsion may be utilized. For example, fans, jets, turbojets, turbo fans, jet engines, and the like may be used to propel the AMV.

The frame 104 or body of the AMV 100 may likewise be of any suitable material, such as graphite, carbon fiber and/or aluminum. In this example, the frame 104 of the AMV 100 includes four rigid members 105-1, 105-2, 105-3, 105-4, or beams arranged in a hash pattern with the rigid members intersecting and joined at approximately perpendicular angles. In this example, rigid members 105-1 and 105-3 are arranged parallel to one another and are approximately the same length. Rigid members 105-2 and 105-4 are arranged parallel to one another, yet perpendicular to rigid members 105-1 and 105-3. Rigid members 105-2 and 105-4 are approximately the same length. In some embodiments, all of the rigid members 105 may be of approximately the same length, while in other implementations, some or all of the rigid members may be of different lengths. Likewise, the spacing between the two sets of rigid members may be approximately the same or different.

While the implementation illustrated in FIG. 1 includes four rigid members 105 that are joined to form the frame 104, in other implementations, there may be fewer or more components to the frame 104. For example, rather than four rigid members, in other implementations, the frame 104 of the AMV 100 may be configured to include six rigid members. In such an example, two of the rigid members 105-2, 105-4 may be positioned parallel to one another. Rigid members 105-1, 105-3 and two additional rigid members on either side of rigid members 105-1, 105-3 may all be positioned parallel to one another and perpendicular to rigid members 105-2, 105-4. With additional rigid members, additional cavities with rigid members on all four sides may be formed by the frame 104. As discussed further below, a cavity within the frame 104 may be configured to include an inventory engagement mechanism for the engagement, transport and delivery of item(s) and/or containers that contain item(s).

In some implementations, the AMV may be configured for aerodynamics. For example, an aerodynamic housing may be included on the AMV that encloses the AMV control system 110, one or more of the rigid members 105, the frame 104 and/or other components of the AMV 100. The housing may be made of any suitable material(s) such as graphite, carbon fiber, aluminum, etc. Likewise, in some implementations, the location and/or the shape of the inventory (e.g., item or container) may be aerodynamically designed. For example, in some implementations, the inventory engagement mechanism may be configured such that when the inventory is engaged it is enclosed within the frame and/or housing of the AMV 100 so that no additional drag is created during transport of the inventory by the AMV 100. In other implementations, the inventory may be shaped to reduce drag and provide a more aerodynamic design of the AMV and the inventory. For example, if the inventory is a container and a portion of the container extends below the AMV when engaged, the exposed portion of the container may have a curved shape.

The propellers 102 and corresponding propeller motors are positioned at both ends of each rigid member 105. The propeller motors may be any form of motor capable of generating enough speed with the propellers to lift the AMV 100 and any engaged inventory thereby enabling aerial transport of the inventory. For example, the propeller motors may each be a FX-4006-13 740 kv multi rotor motor. Example implementations of motor configurations that may be used with various implementations are described in further detail below with respect to FIGS. 3A-3C, FIGS. 4A-4C and FIG. 5.

Extending outward from each rigid member is a support arm 106 that is connected to a safety barrier 108. In this example, the safety barrier is positioned around and attached to the AMV 100 in such a manner that the motors and propellers 102 are within the perimeter of the safety barrier 108. The safety barrier may be plastic, rubber, etc. Likewise, depending on the length of the support arms 106 and/or the length, number or positioning of the rigid members 105, the safety barrier may be round, oval, or any other shape.

Mounted to the frame 104 is the AMV control system 110. In this example, the AMV control system 110 is mounted in the middle and on top of the frame 104. The AMV control system 110, as discussed in further detail below with respect to FIG. 12, controls the operation, routing, navigation, communication, object sense and avoid, and the inventory engagement mechanism of the AMV 100.

Likewise, the AMV 100 includes one or more power modules 112. In this example, the AMV 100 includes two power modules 112 that are removably mounted to the frame 104. The power module for the AMV may be in the form of battery power, solar power, gas power, super capacitor, fuel cell, alternative power generation source, or a combination thereof. For example, the power modules 112 may each be a 6000 mAh lithium-ion polymer battery, polymer lithium ion (Li-poly, Li-Pol, LiPo, LIP, PLI or Lip) battery. The power module(s) 112 are coupled to and provide power for the AMV control system 110 and the propeller motors.

In some implementations, one or more of the power modules may be configured such that it can be autonomously removed and/or replaced with another power module while the AMV is landed. For example, when the AMV lands at a delivery location, relay location and/or materials handling facility, the AMV may engage with a charging member at the location that will recharge the power module.

As mentioned above, the AMV 100 may also include an inventory engagement mechanism 114. The inventory engagement mechanism may be configured to engage and disengage items and/or containers that hold items. In this example, the inventory engagement mechanism 114 is positioned within a cavity of the frame 104 that is formed by the intersections of the rigid members 105. The inventory engagement mechanism may be positioned beneath the AMV control system 110. In implementations with additional rigid members, the AMV may include additional inventory engagement mechanisms and/or the inventory engagement mechanism 114 may be positioned in a different cavity within the frame 104. The inventory engagement mechanism may be of any size sufficient to securely engage and disengage containers that contain inventory. In other implementations, the engagement mechanism may operate as the container, containing the inventory item(s) to be delivered. The inventory engagement mechanism communicates with (via wired or wireless communication) and is controlled by the AMV control system 110.

While the implementations of the AMV discussed herein utilize propellers to achieve and maintain flight, in other implementations, the AMV may be configured in other manners. For example, the AMV may include fixed wings and/or a combination of both propellers and fixed wings. For example, the AMV may utilize one or more propellers to enable takeoff and landing and a fixed wing configuration or a combination wing and propeller configuration to sustain flight while the AMV is airborne.

Figure 2:
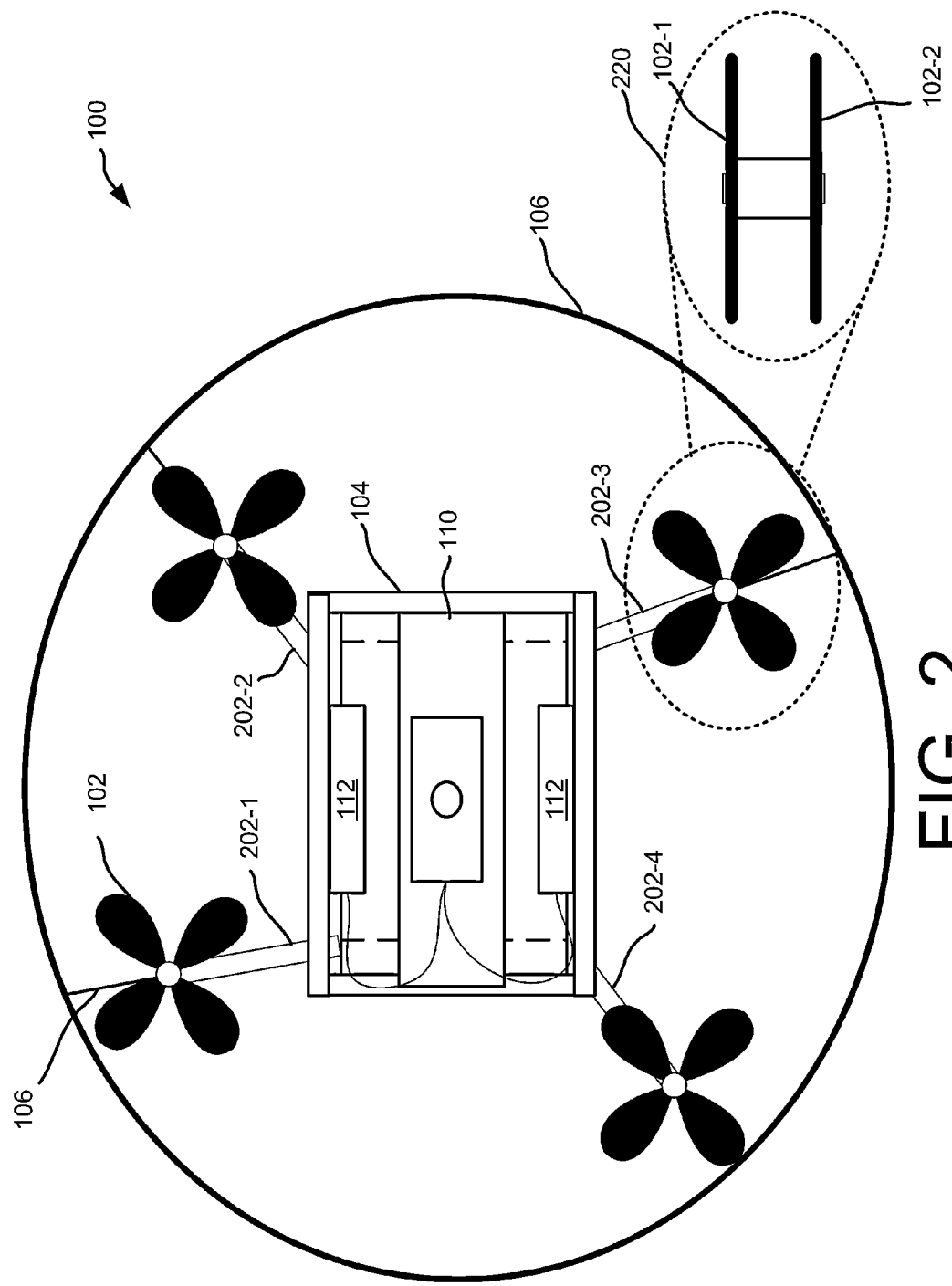
FIG. 2 depicts another block diagram of a top-down view of an automated mobile vehicle, according to an implementation.

FIG. 2 depicts another block diagram of a top-down view of an automated mobile vehicle 100, according to an implementation. The AMV 100 of FIG. 2 is similar to the AMV 100 of FIG. 1 in that it may include an AMV control system 110 mounted to a frame 104. Likewise, the AMV 100 may also include one or more power modules 112, support arms 106 and/or a safety barrier. In comparison to the AMV 100 of FIG. 1, the AMV 100 illustrated in FIG. 2 may include rigid members 202-1, 202-2, 202-3, 202-4 that extend from the frame 104, upon which the motors and propellers 102 are mounted. The rigid members 202-1, 202-2, 202-3, 202-4 may extend at the same or different angles from the frame 104 of the AMV 100. As illustrated, the rigid members extend at different angles from the frame 104 of the AMV. Likewise, one or more of the rigid members may be of different lengths with respect to other rigid members. As discussed further below, if rangefinders are included at the ends of the rigid members (e.g., by including the rangefinders in the motors mounted on the ends of the rigid members) by positioning the rigid members at different angles and/or extending the rigid members at different lengths, the area covered by the rangefinders may be increased.

In the AMV 100 illustrated in FIG. 2, the AMV still utilizes eight propellers, however, in comparison to the AMV 100 of FIG. 1, the propellers are in a coaxial, stacked or paired configuration, as illustrated by the expanded side view 205 of the motor 220. As illustrated in the expanded side view 205, for example, propellers 102-1 and 102-2 are mounted in a stacked coaxial configuration. The stacked propellers may rotate in opposite directions and may be propelled by the same or different motors.

FIGS. 3A-3C depict block diagrams of a motor assembly of an AMV 100 illustrated in FIG. 1 or 2, according to an implementation. FIGS. 3A-3B illustrate components of a block diagram of an inrunner brushless motor. FIG. 3C is a block diagram of an outrunner brushless motor. As known in the art, the rotor is a set of magnets mounted to a drive or arm that rotates. For an inrunner brushless motor, such as illustrated in FIGS. 3A-3B, the rotor 300 is mounted to a drive or arm 302 and positioned inside the stator 310 (FIG. 3B). In comparison, for an outrunner brushless motor 330, the outer portion of the motor 330 (FIG. 3C) is the rotor which rotates around the inner portion, or stator. In either configuration the drive or arm 302 is mounted to the rotor and rotates with the rotor.

A rotor typically has four or more magnetic poles. The stator, also known as an armature, includes an electromagnetic assembly. In configurations where the stator is positioned around the rotor (FIGS. 3A-3B), the stator 310 has an exterior surface 312 and interior surface 314 that houses the electromagnetic assembly. Typically the stator 310, exterior surface 312, and interior surface 314 are configured in a cylindrical manner, as shown in FIG. 3B and form a cavity into which the rotor 300 is placed.

Returning to FIG. 3A, for inrunner brushless motors in which the rotor is positioned within the cavity of the stator 310, one or more distance determining elements 304 are coupled to the rotor 300 such that the distance determining elements 304 rotate as the rotor 300 rotates. For example, the distance determining element may be coupled to magnets that form the rotor and/or coupled to the drive 302. In this example, two distance determining elements 304-1, 304-2 are coupled to opposite ends of the rotor 300 and oriented in opposite directions. By incorporating pairs of distance determining elements at opposing ends of the rotor 300, rotational balance of the rotor is maintained. If there is a protective housing around the motor, one or more openings may also be included in the housing so that the distance determining element may transmit through the openings.

The distance determining elements 304 may be any form of device that can be used to measure a distance between an object and the distance determining element. For example, the distance determining elements 304 may be any one of an ultrasonic ranging module, a laser rangefinder, a radar distance measurement module, stadiametric based rangefinder, a parallax based rangefinder, a coincidence based rangefinder, a Lidar based rangefinder, Sonar based range finder, or a time-of-flight based rangefinder. In some implementations, different distance determining elements may be utilized on the AMV. For example, the distance determining element 304-1 may be a laser rangefinder and the distance determining element 304-2 may be a radar distance measuring module.

Turning now to FIG. 3B, illustrated is a stator 310 or the outer portion of an inrunner brushless motor. The stator 310 may include one or more openings 316 that extend through the interior surface 314 and the exterior surface 312 of the stator 310 at positions proximate to where the distance determining elements will be located when the rotor 300 is positioned within the cavity of the stator 310. The openings 316 are positioned such that when the rotor 300 rotates and the distance determining element emits, for example, a laser signal, the projected laser signal will pass through one of the openings 316. In this example, there are two sets of openings in the stator 310, one set that extends around the upper portion of the stator 310 at a position proximate to where the distance determining element 304-1 will be located and a second set that extends around the lower portion of the stator 310 at a position proximate to where the distance determining element 304-2 will be located. When the rotor 300 is positioned within the stator 310, the distance determining elements are proximate to the openings 316 such that when the distance determining element(s) emit, for example, a laser signal, the laser signal will pass through the openings. If an object is present, the projected laser signal will reflect off the object and enter the motor through the opening and be received by the distance determining element 304. Because distance measurements may be determined based on ToF, even though the rotor and thus the distance determining element(s) are rotating, an emitted laser signal will pass through and return through the same opening and can be used to determine a distance to an object off of which the laser signal reflected. The openings may be of any size and/or shape. Likewise, in implementations where the motor has a protective housing around the perimeter of the motor, the protective housing may include one or more openings positioned such that the distance determining elements can project through the openings.

While the example above illustrates an inrunner brushless motor, in other implementations, the motor may be configured as a brushed motor (not shown). As in known in the art, in contrast to a brushless motor, for a brushed motor, the electromagnetic coils are located on the rotor which rotates with respect to a stationary stator, that includes the permanent magnet. In a typical brushed motor, a brush or other contact element, engages with the rotor to provide energy to the electromagnetic coils. Regardless of the motor configuration, the distance determining element may be mounted to the inner rotating part (e.g., FIG. 3A) and configured to project out through the outer stationary part. Alternatively, the distance determining element may be coupled to the outer rotating part (FIG. 3C) and project outward.

Turning to FIG. 3C, for outrunner brushless motors 330 in which the rotor 320 is positioned around and outside of the stator 324 (i.e., the stator is positioned within the cavity of the rotor), one or more distance determining elements 304 are coupled to the rotor 320 or the drive or arm 302 such that the distance determining elements 304 rotate as the rotor 320 rotates. In this example, two distance determining elements 304-1, 304-2 are coupled to drive 302 and oriented in opposite directions. By incorporating pairs of distance determining elements, rotational balance of the rotor is maintained. If there is a protective housing around the motor, the distance determining elements may be positioned above and outside the housing or one or more openings may be included in the housing so that the distance determining elements may transmit through the openings.

In some implementations, the motor may include an Electronic Speed Control (ESC) circuitry 322 that keeps track of the position of the rotor 300 so it can control the electromagnetics of the stator. This may be done using, for example, magnetic sensors (based on the Hall-effect) or using what is known as "sensorless" techniques. Roughly, using sensorless techniques, the position of the rotor is determined by monitoring the motor power wires (not shown) for fluctuations caused by the spinning magnets of the rotor. Other techniques may also be utilized for determining the position of the rotor. For example, a marker or other identifier may be included on the rotor, drive 302 and/or propeller at a determined position. A sensor may be used to detect the position of the marker and each time the marker passes the sensor the position of the rotor and thus the distance determining element(s) are known. In some implementations, the position of the rotor may not be determined and/or may only be determined periodically. For example, the position of the rotor may not be monitored unless an object is detected. When an object is detected, the position of the rotor may be determined to determine the position of the AMV with respect to the object.

By mounting the distance determining elements at known positions on the rotor or drive and monitoring the position of the rotor or drive, the timing of the emission of, for example, a laser signal from the distance determining elements can be maintained such that the laser signal is only emitted when the distance determining element is oriented such that the emitted laser signal will project through an opening. By timing the emissions such that they pass through the openings in the stator and/or protective housing, objects that intersect with a 360 degree plane around the motor can be detected and a distance between the detected object(s) and the motor can be determined. Also by knowing the position of the distance determining element(s), the direction of the emission is also known. When an object is detected, the distance to the object is determined and based on the position of the distance determining element, the direction of the object with respect to the AMV is also determined.

FIGS. 4A-4C depict block diagrams of another motor assembly of an automated mobile vehicle illustrated in FIG. 1 or 2, according to an implementation. The example discussed with respect to FIGS. 4A-4C relate to an outrunner brushless motor. However, similar to the discussion with respect to FIGS. 3A-3C, any type of motor may be utilized with the implementations described herein.

Turning first to FIG. 4A, the stator 400 may include a plurality of reflective surfaces 406 mounted to the exterior of stator 400. The reflective surfaces 406 may be the same and/or different sizes, the same and/or different shapes, the same and/or different colors, etc. Likewise, the orientation and angle with respect to the stator 400 may also be the same and/or different. For example, the reflective surfaces 406 may be mounted at different angles with respect to the stator 400 so that, for example, the angle of incidence of an emitted laser signal is not 90 degrees and thus the angle of reflection results in the laser signal reflecting away from the distance determining element that emitted the laser signal, as illustrated in FIG. 4C. The reflective surfaces may be any form of reflective surface, such as a mirror or other metallic surface. In the example illustrated in FIG. 4A, the reflective surfaces 406 are all square shape. However, as will be appreciated, in other implementations, the shapes may vary. For example, the reflective surfaces may be square, rectangular, oval, round, etc.

In still other implementations, rather than using multiple reflective surfaces on the stator 400, the stator 400 may be completely covered with a single reflective surface (not shown) that covers a majority of the surface of the stator 400. In such an implementation, the single reflective surface may have varying faces of different angles, or may have a uniform angle about the stator 400. In either case, the distance determining element(s) (discussed below with respect to FIG. 4B) may be positioned at angles other than 90 degrees with respect to the stator 400 and/or the reflective surface.

As illustrated in FIG. 4B, the rotor 410, or exterior portion of the motor, may include multiple openings that extend through the interior surface 414 and the exterior surface 412 of the rotor 410 such that an emitted laser signal can project through an opening 416, reflect off an object and return through the opening 416. Extending the openings along the rotor 410 reduces weight of the motor and allows the reflected laser signal to be projected at various angles when reflected off of the reflective surfaces 406 mounted to the stator 400.

In addition to the openings, one or more distance determining elements 404 may be mounted to the interior surface 414 of the rotor 410 and positioned to emit, for example, a laser signal toward the stator 400 when the stator is positioned in the cavity of the rotor 410. The emitted laser signal will reflect off of one of the reflective surfaces 406 mounted on the stator 400, project through one of the openings 416 of the rotor 410 and, if an object is present, reflect off of the object, return through the opening 416, reflect off of the reflective surface 406 and return to the distance determining element. Using ToF, the distance determining element can determine the distance between the motor 420 and the object.

As illustrated in FIG. 4C, when the emitted laser signal reflects off a reflective surface that is aligned at an angle other than 90 degrees to the stator (or the distance determining element), the angle of incidence, and thus the angle of reflectance will not be 90 degrees and the laser signal will project off at an angle of reflectance that is equal to the angle of incidence. In this example, as the rotor rotates, the laser signal emitted from a single distance determining element for each measurement will reflect off of different reflective surfaces at different angles and in different directions, thereby allowing detection of objects at different positions with respect to the motor.

While the above example describes an outrunner brushless motor in which the rotor surrounds the stator, the distance determining elements are mounted on and rotate with the rotor and the stator includes the reflective surfaces, a similar configuration is possible with an inrunner brushless motor and/or a brushed motor in which the rotor is positioned within a cavity formed by an outer, stationary, stator. In such implementations, the reflective surfaces are mounted on the inner, rotating, rotor and the distance determining elements are mounted to the interior surface of the outer, stationary, stator.

In some implementations, the motor 420 may include ESC circuitry 422 that keeps track of the position of the rotor so it can control the electromagnetics of the stator. As discussed above, this may be done using, for example, magnetic sensors (based on the Hall-effect) or using sensorless techniques. By mounting the distance determining elements at known positions on the interior surface 414 of the rotor 410 and monitoring the position of the rotor 410 as it rotates around the stator, the timing of the emission of, for example, a laser signal from the distance determining elements can be maintained such that the laser signal is only emitted when the distance determining element is aligned with a reflective surface that will result in the laser signal being reflected and projected through an opening 416 in the rotor 410, as illustrated in FIG. 4C. For example, a marker or other identifier may be included on the rotor, drive 302 and/or propeller at a determined position. A sensor may be used to detect the position of the marker and each time the marker passes the sensor the position of the rotor and thus the distance determining element(s) are known.

FIG. 5 depicts a block diagram of an outrunner brushless motor assembly 500 of an automated mobile vehicle illustrated in FIG. 1 or 2, according to an implementation. As discussed above, in an outrunner brushless motor 500 the rotor 502 is positioned on the outside of the motor and rotates around an inner, stationary, stator 501. In this implementation, the reflective surfaces 506 are mounted on the exterior of the rotor 502 and the distance determining element(s) 504 is coupled to the AMV 100 (FIG. 1), such as the rigid member 105 of the AMV 100. As with the other implementations, the reflective surfaces 506 may be of any size, shape, angle and/or orientation with respect to the rotor 502. The distance determining element(s) 504 remain stationary and the projected laser signal from the distance determining element(s) 504 is projected toward and reflects off the different reflective surfaces 506 as the rotor 502 rotates.

Figure 6:
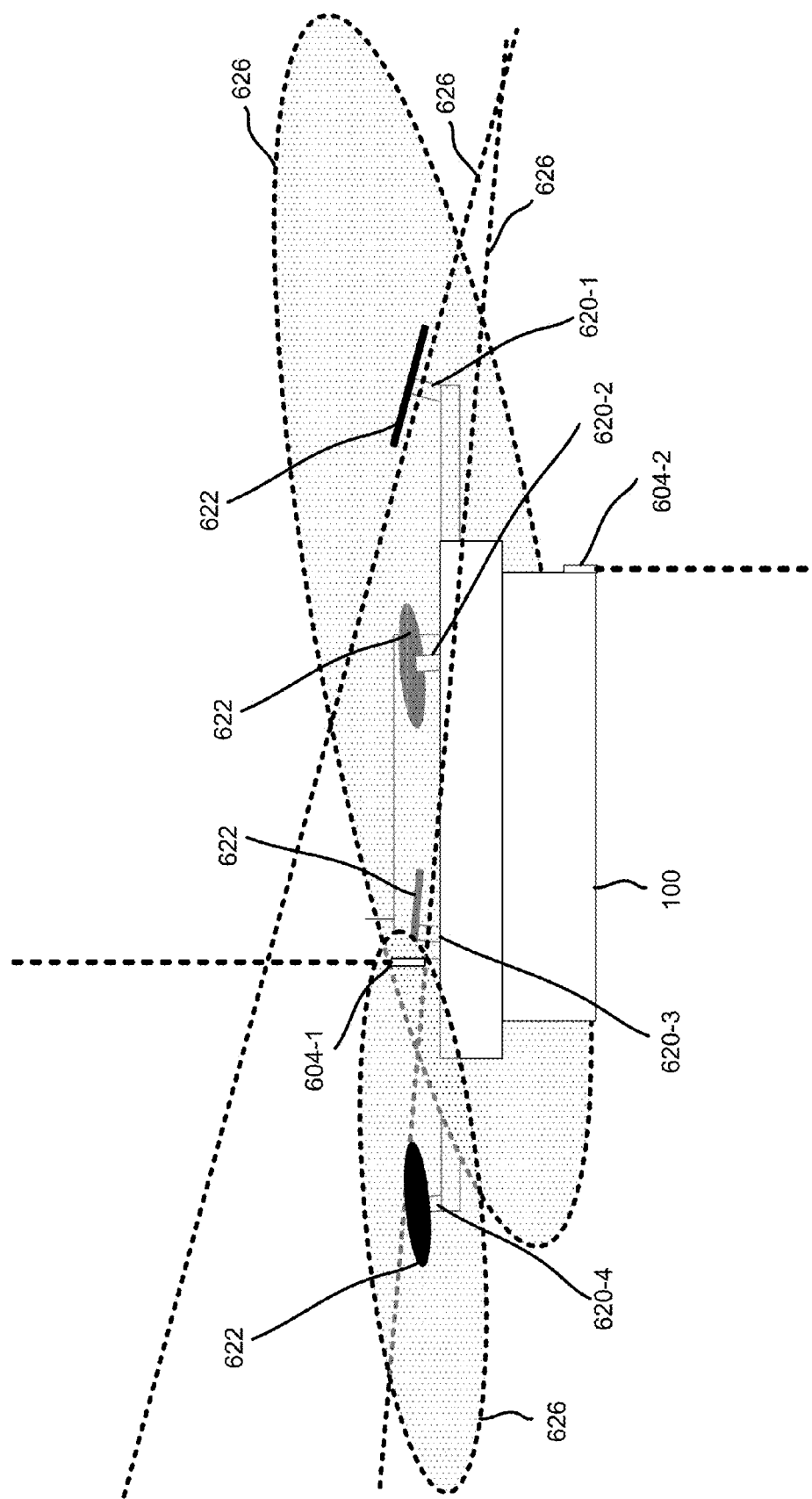
FIG. 6 depicts a block diagram of a side view of an automated mobile vehicle, according to an implementation.

FIG. 6 depicts a block diagram of a side view of an automated mobile vehicle 100, according to an implementation. In this implementation, the AMV 100 may include one or more motors 620 with incorporated distance determining elements, such as those discussed above with respect to FIGS. 3A-FIG. 5. Additional distance determining elements 604 may also be included on the AMV 100. For example, distance determining element 604-1 may be mounted in a fixed position to detect objects above the AMV 100. Likewise, distance determining element 604-2 may be mounted in a fixed position to detect objects below the AMV 100.

In the side view of the AMV illustrated in FIG. 6, four motors 620 and propellers 622 are visible. In other implementations, additional or fewer motors 620 and/or propellers may be included in the AMV 100. For example, as discussed above, propellers may be mounted in pairs. As shown by the planar trajectory patterns 626 emitted from each motor 620, using a motor with an incorporated distance determining element will result in a detection pattern that covers a 360 degree planar surface about the motor 620. Implementations that utilize reflective surfaces to reflect the laser signal projected by the distance determining element will result in a detection pattern that covers a 360 surface around the motor 620 that covers multiple planes, each plane corresponding to an angle of reflection from a reflective surface.

As illustrated, the motors and corresponding propellers may be mounted to the body of the AMV at different angles such that the projection patterns of the incorporated distance determining elements cover different planar surfaces, as illustrated in FIG. 6. For example, the motors 620 and corresponding propeller 622 may be offset between approximately 0-10 degrees with respect to the body of the AMV 100 and/or each other. Each motor may be aligned on an axis and in some implementations the axis of two or motors may be different.

FIG. 6 illustrates the right side view of the AMV 100 such that the motor 620-1 is at the front of the AMV 100 and the motor 620-4 is at the rear of the AMV 100. The motors 620 and corresponding propellers 622 may be offset in any direction with respect to the body of the AMV 100. In FIG. 6, the front motor 620-1 and propeller 622 are offset approximately 6 degrees toward the front of the AMV 100 with no offset to the left or right, with respect to the orientation of the AMV 100. Motor 620-2 and corresponding propeller 622 are offset approximately 3 degrees away from the front and approximately 9 degrees toward the left of the body of the AMV 100. Motor 620-3 and corresponding propeller 622 are offset approximately 2 degrees toward the front of the body of the AMV 100 and 0 degrees to the right or left of the body of the AMV 100. Finally, the motor 620-4 and corresponding propeller 622 are offset approximately 1 degree away from the front of the body of the AMV 100 and approximately 8 degrees toward the right of the body of the AMV 100. In other implementations, any offset configuration and/or amounts of motor offsets may be utilized. In some implementations, the offset or orientation of one or more of the motors 620 may be altered while the AMV is in operation. For example, during normal flight, all of the motors 620 may all be positioned with 0 degrees of offset. When the AMV 100 detects an object, is preparing to land, preparing to take off, entering a congested area, etc. the orientation of the motors 620 may be altered to expand the area of object detection around the AMV 100 and to increase the agility of the AMV 100.

By offsetting the motors 620 that include distance determining elements, the total area around the AMV 100 within which an object can be detected is increased. Likewise, because the propellers are not in alignment, the agility and maneuverability of the AMV 100 increases.

Figure 7:
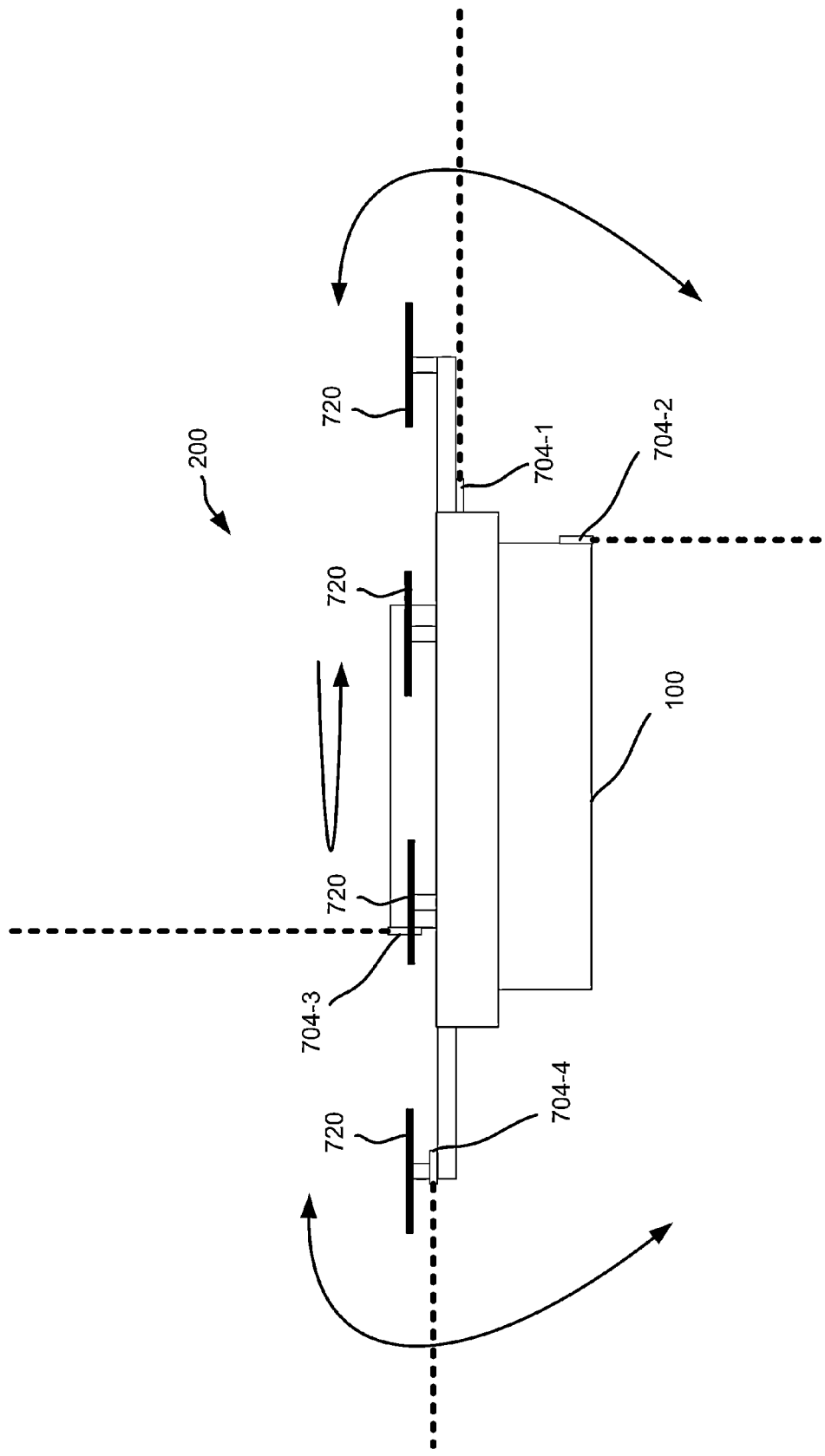
FIG. 7 depicts a block diagram of a side view of an automated mobile vehicle, according to an implementation.

FIG. 7 depicts a block diagram of another side view 200 of an AMV 100, according to an implementation. In this example, rather than offsetting the motors as discussed with respect to FIG. 6, the motors and corresponding distance determining elements may be fixed as shown in FIG. 7. For example, the motors 720 may all be mounted at 90 degrees with respect to the AMV 100. The distance determining elements 704 may be incorporated into the motors 720, as discussed above, and/or mounted to the AMV 100, as shown in FIG. 7. For example, distance determining element 704-1 may be mounted to the AMV 100 and oriented to emit a laser signal that projects from the front of the AMV 100. The distance determining element 704-2 may be mounted to the AMV 100 and oriented to emit a laser signal that projects down from the AMV 100. The distance determining element 704-3 may be mounted to the AMV 100 and oriented to emit a laser signal that projects above the AMV 100. The distance determining element 704-4 may be mounted to the AMV 100 and oriented to emit a laser signal that projects behind the AMV 100.

While the example illustrated in FIG. 7 includes four distance determining elements mounted to the AMV 100, in other implementations, fewer or additional distance determining elements may be utilized. Likewise, the distance determining elements may be mounted to the AMV, incorporated into the motors 720, as discussed above, or a combination thereof. Likewise, the motors 720 may all be mounted at the same angle with respect to the AMV 100 or one or more of the motors 720 may be offset in the manner discussed above with respect to FIG. 6

Regardless of the configuration of the distance determining elements and/or the position of the motors 720, the detectable area around the AMV can be further increased by manipulating the pitch, yaw and/or roll of the AMV while it is moving. For example, the pitch of the AMV 100 may periodically altered. By altering the pitch of the AMV 100, the area covered by the distance determining elements projecting in front of and behind the AMV 100 is increased. Likewise, the roll of the AMV 100 may be periodically altered. By altering the roll of the AMV 100, the area covered by the distance determining elements projecting to the right or left of the AMV 100 is increased. By altering the yaw of the AMV 100, the area around the distance determining elements projecting out of the front, rear and sides of the AMV 100 will cover the entire area around the AMV 100. By combining one or more of altering the pitch, roll and/or yaw while the AMV is in motion, the area around the AMV 100 detectable by the distance determining elements is further increased. Likewise, with AMVs such as a quad-copter or an octo-copter, the direction of the AMV may be maintained even though the pitch, yaw and roll is altered. For example, an AMV may be moving north and the yaw may be adjusted so that the AMV 100 rotates in a clockwise direction. The rotation can occur without altering the direction of flight. Likewise, the pitch and/or roll can be adjusted without altering the flight path of the AMV 100.

Figure 8:
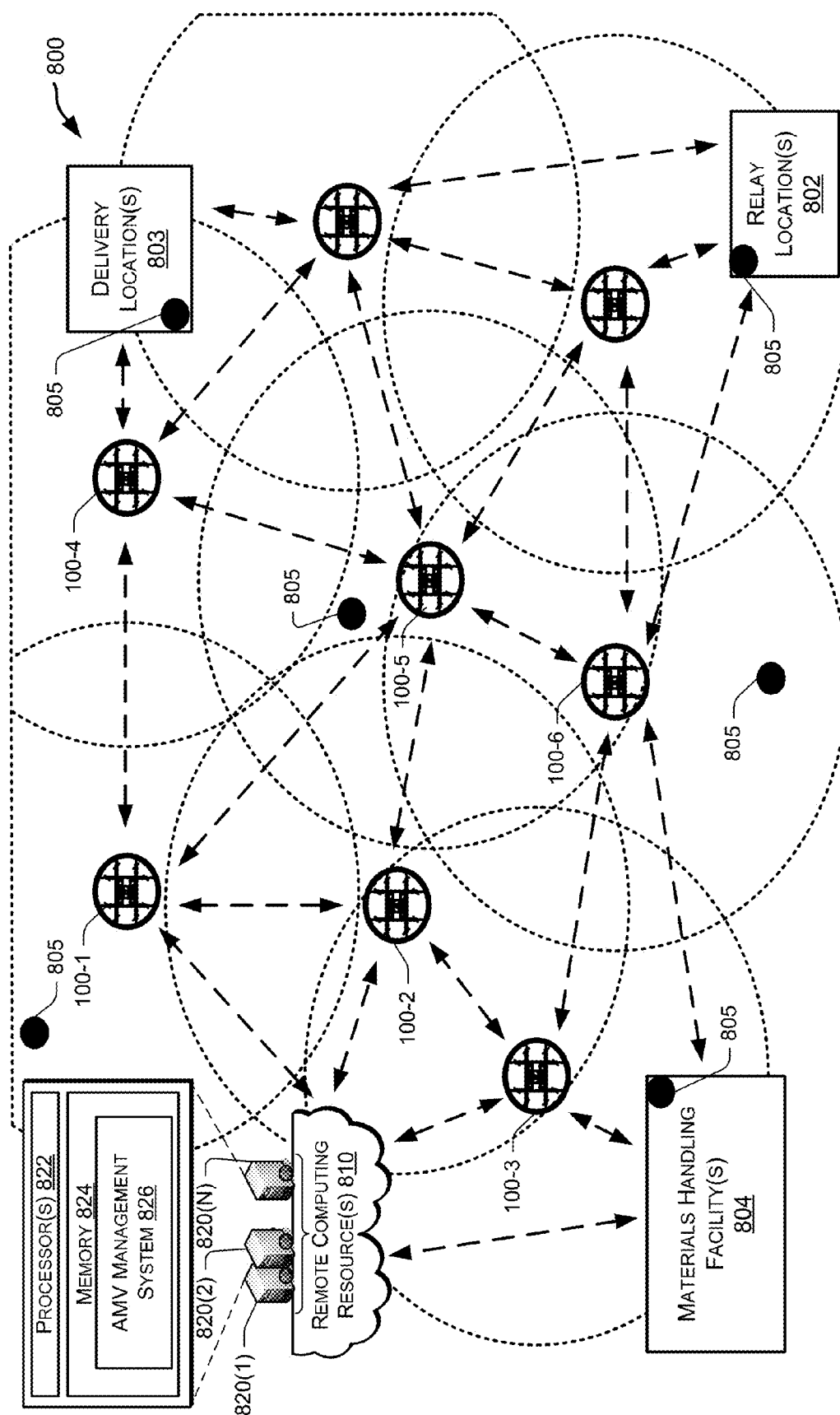
FIG. 8 depicts a diagram of an automated mobile vehicle environment, according to an implementation.

FIG. 8 depicts a block diagram of an AMV network 800 that includes AMVs 100, delivery locations 803, relay locations 802, materials handling facilities 804 and remote computing resources 810, according to an implementation. In addition, one or more fixed position transmitters 805 may be included in the environment that transmit fixed position information (e.g., geographic coordinates). The fixed position transmitters may be included at any known, fixed location. For example, the fixed position transmitters may be included on a materials handling facility(s) 804, relay location(s) 802, delivery location(s) 803, on cellular towers (not shown), on buildings, on landing areas (FIG. 10), or at any other known location.

Each of the AMVs 100, delivery locations 803, relay locations 802, materials handling facilities 804 and/or remote computing resources 810 may be configured to communicate with one another. For example, the AMVs 100 may be configured to form a wireless mesh network that utilizes Wi-Fi or another wireless means of communication, each AMV communicating with other AMVs within wireless range. In other implementations, the AMVs 100, AMV management system 826, materials handling facilities 804, relay locations 802 and/or the delivery locations 803 may utilize existing wireless networks (e.g., cellular, Wi-Fi, satellite) to facilitate communication. Likewise, the remote computing resources 810, materials handling facilities 804, delivery locations 803 and/or relay locations 802 may also be included in the wireless mesh network. In some implementations, one or more of the remote computing resources 810, materials handling facilities 804, delivery locations 803 and/or relay locations 802 may also communicate with each other via another network (wired and/or wireless), such as the Internet.

The remote computing resources 810 may form a portion of a network-accessible computing platform implemented as a computing infrastructure of processors, storage, software, data access, and other components that is maintained and accessible via a network, such as the mesh network and/or another wireless or wired network (e.g., the Internet). As illustrated, the remote computing resources 810 may include one or more servers, such as servers 820(1), 820(2), . . . , 820(N). These servers 820(1)-(N) may be arranged in any number of ways, such as server farms, stacks, and the like that are commonly used in data centers. Furthermore, the servers 820(1)-(N) may include one or more processors 822 and memory 824 which may store an AMV management system 826.

The AMV management system 826 may be configured, for example, to communicate with the delivery locations 803, AMVs 100, materials handling facilities 804, and/or relay locations 802. As an example, position information for each AMV 100 may be determined and shared among AMVs. Each AMV may periodically transmit, for example, ADS-B information to other AMVs in the network. When information, such as ADS-B information, is sent to or from an AMV, the information may include an identifier for the AMV and each AMV may act as a node within the network, forwarding the information until it is received by the intended AMV. For example, the AMV management system 826 may send a message to AMV 100-6 by transmitting the information and the identifier of the intended receiving AMV to one or more of AMVs 100-1, 100-2, 100-3, 100-4 that are in wireless communication with the AMV management system 826. Each receiving AMV will process the identifier to determine if it is the intended recipient and then forward the information to one or more other AMVs that are in communication with the AMV. For example, AMV 100-2 may forward the message and the identification of the intended receiving AMV to AMV 100-1, 100-3 and 100-5. In such an example, because 100-3 has already received and forwarded the message, it may discard the message without forwarding it again, thereby reducing load on the mesh network 800. The other AMVs, upon receiving the message, may determine that they are not the intended recipients and forward it on to other nodes. This process may continue until the message reaches the intended recipient.

In some implementations, if an AMV loses communication with other AMVs via the wireless mesh network, it may activate another wireless communication path to regain connection. For example, if an AMV cannot communicate with any other AMVs via the mesh network 800, it may activate a cellular and/or satellite communication path to obtain communication information from the AMV management system 826, materials handling facility 804, relay location 802 and/or a delivery location 803. If the AMV still cannot regain communication and/or if it does not include an alternative communication component, it may automatically and autonomously navigate toward a designated location (e.g., a nearby materials handling facility 804, relay location 802 and/or delivery location 803.

The wireless mesh network 800 may be used to provide communication between AMVs (e.g., to share weather information, location information, routing information, landing areas), AMV management system 826, materials handling facilities 804, delivery locations 803 and/or relay locations 802. Likewise, in some implementations, the wireless mesh network may be used to deliver content and/or other information to other computing resources, such as personal computers, electronic book reading devices, audio players, mobile telephones, tablets, desktops, laptops, etc. For example, the mesh network may be used to deliver electronic book content to electronic book reading devices of customers.

Figure 9:
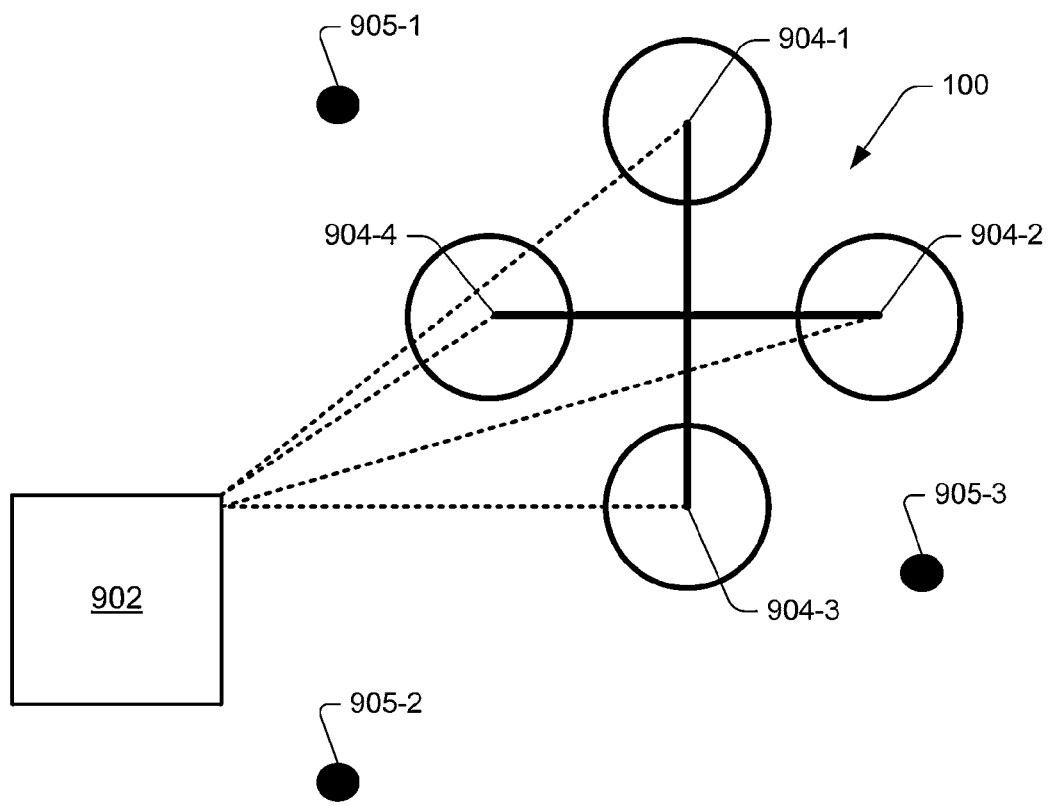
FIG. 9 depicts a block diagram of an automated mobile vehicle sensing an object, according to an implementation.

FIG. 9 depicts a block diagram of an AMV 100 that includes four distance determining elements 904-1, 904-2, 904-3, and 904-4 used to determine a distance between the AMV 100 and another object 902, according to an implementation. As illustrated, each of the distance determining elements may utilize ToF to determine a distance between the distance determining element 904 and the object 902. By separating the distance determining elements 904-1-904-4 beyond a minimum distance, the ToF differences can be used to determine the distance between the object and/or the position of the AMV 100 with respect to the object 902. For example, if the degree of accuracy of each distance determining element is ±15 centimeters, each of the distance determining elements may be separated by more than 15 centimeters and used to determine the position of the AMV 100 with respect to an object. In some implementations, rather than determining a distance to an object, one or more of the distance determining elements may be configured to detect a proximity or existence of an object within a proximity of the AMV 100. For example, one of the distance determining elements may only detect whether an object is within a defined proximity of the AMV 100.

Returning to FIG. 9, distance determining element 904-1 and 904-3 are separated by 60.96 centimeters and distance determining elements 904-2 and 904-4 are also separated by 60.96 centimeters. Distance determining elements 904-1 and 904-2 are separated by 43.10 centimeters. Likewise, distance determining elements 904-1 and 904-4 are separated by 43.10 centimeters, distance determining elements 904-2 and 904-3 are separated by 43.10 centimeters and distance determining elements 904-3 and 904-4 are separated by 43.10 centimeters.

Each of the distance determining elements may identify the object 902 and determine the distance from the object 902. For example, distance determining element 904-3 may detect the object 902 and determine that the object 902 is 457.2 centimeters from distance determining element 904-3. Distance determining element 904-4 may also detect the object 902 and determine that the object is 427.94 centimeters from the distance determining element 904-4. Distance determining element 904-2 may detect the object 902 and determine that the object is 488.60 centimeters from the distance determining element 904-2. Based on these three distance measurements, the distance from the AMV 100 is known and the relative position of the AMV 100 is also known. Specifically, it is known that the AMV 100 is oriented such that the distance determining elements 904-4 and 904-3 mounted on the AMV 100 are closer to the object 902 than distance determining elements 904-1 and 904-2. The fourth distance determining element may also be used to determine the distance to the object and/or the position of the AMV 100 with respect to the object 902. This extra distance determining element may be included for redundancy or to confirm distance and/or positioning.

Utilizing the different determined distances, a distance between the AMV 100 and the object 902 may be determined. In some implementations, this distance may be an average of the determined distances. In other implementations, the distance between the AMV 100 and the object 902 may be determined as the shortest distance determined by the distance determining elements 904.

In some implementations, the AMV 100 may also receive fixed position information transmitted from fixed position transmitters 905. For example, fixed position transmitters 905-1, 905-2, 905-3 may transmit position information (e.g., geographic coordinates). The AMV 100 may receive this information from three or more fixed position transmitters and using well known triangulation algorithms determine the absolute position of the AMV 100. Alternatively, or in addition thereto, the AMV may include a global positioning (GPS) receiver configured to receive GPS data from satellites. Having the absolute position of the AMV 100 and the relative position and distance between the object and the AMV 100, the absolute position of the object 902 can be determined. As objects are identified and absolute position information determined, the information may be provided to other AMVs 100 and/or the AMV management system 826.

Figure 10:
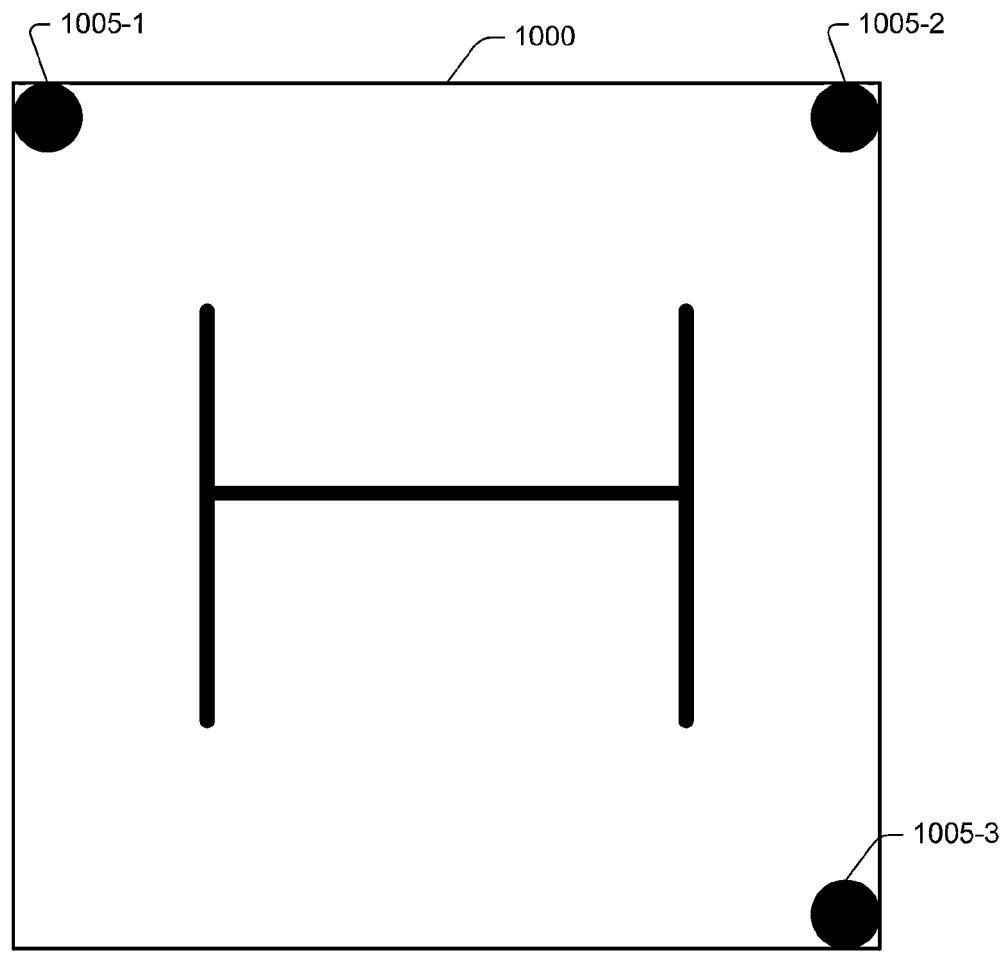
FIG. 10 depicts a block diagram of an automated mobile vehicle landing area, according to an implementation.

As another example, FIG. 10 presents a top-down view of an AMV landing area 1000 that includes three fixed position transmitters 1005-1, 1005-2, 1005-3, according to an implementation. As discussed above, the fixed position transmitters may transmit fixed position information that is received by AMVs and used by AMVs to determine the absolute position of the AMV. In this example, fixed position transmitter 1005-1 is 120 centimeters from fixed position transmitter 1005-2 and fixed position transmitter 1005-2 is 120 centimeters from fixed position transmitter 1005-3. Each of the three transmitters 1005-1-1005-3 are positioned at corners of the landing area 1000 and can be detected by an AMV 100 and used for precise landing. For example, an AMV may receive the fixed position information transmitted by each of the fixed position transmitters and determine an absolute position of the AMV and utilize that information for landing, takeoff and/or navigation of the AMV. This may be used in addition to or as an alternative to GPS based navigation. For example, if the AMV is utilized inside a materials handling facility, GPS data may not be available but can navigate based on the absolute position determined from receiving fixed position information transmitted from fixed position transmitters.

Figure 11:
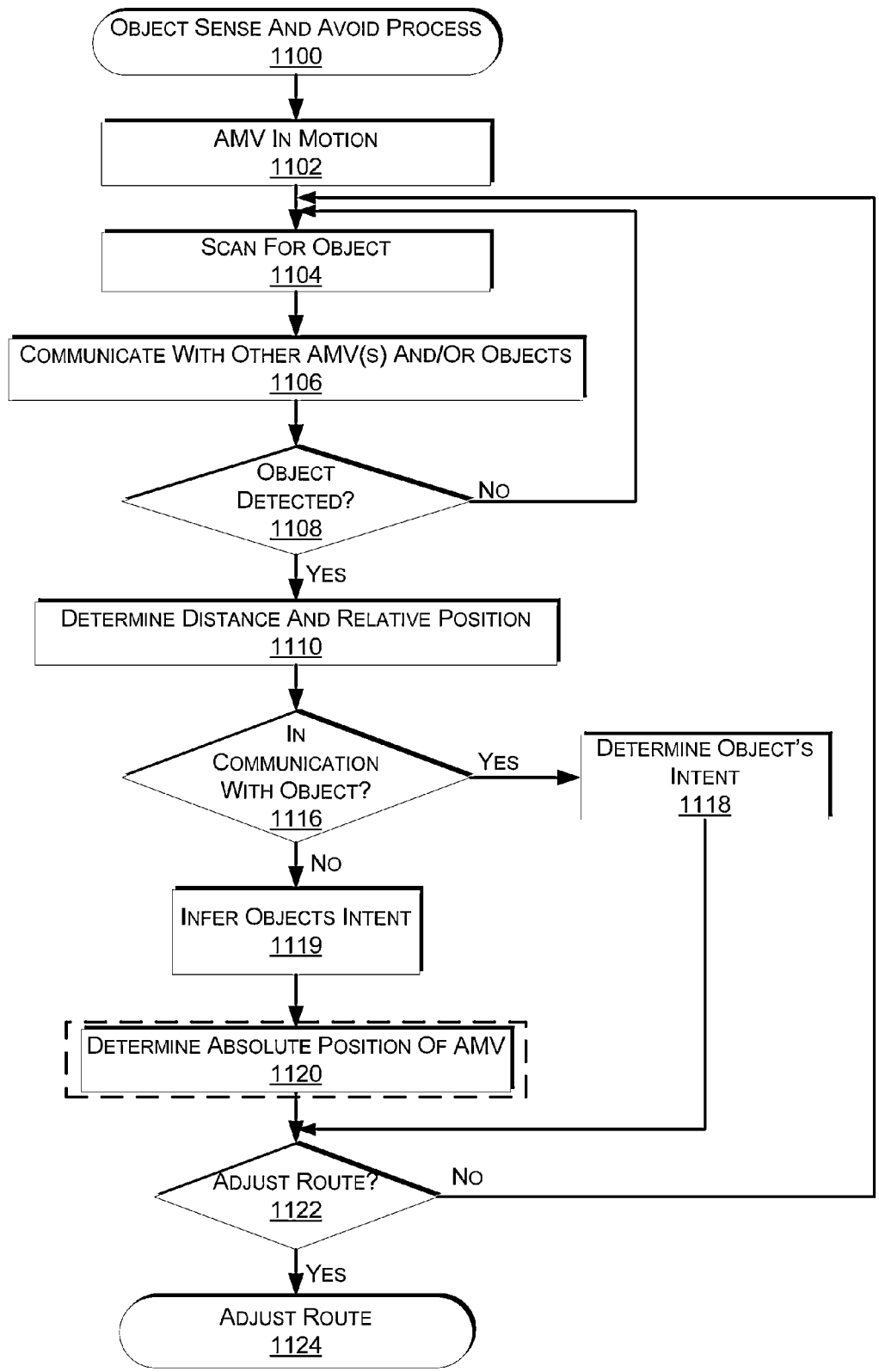
FIG. 11 is a flow diagram illustrating an example object sense and avoid process, according to an implementation.

FIG. 11 is a flow diagram illustrating an example object sense and avoid process 1100, according to an implementation. This process, and each process described herein, may be implemented by the architectures described herein or by other architectures. The process is illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

The example process 1100 begins when the AMV is in motion (e.g., airborne), as in 1102. While the AMV is in motion, the process continually scans for objects, for example, using the implementations discussed above, as in 1104. In some implementations, multiple modes of detection may be utilized. For example, both distance determining elements and image capture devices (e.g., cameras) may be used together to identify and/or determine the location of objects. Likewise, in some implementations, multiple forms of distance determining elements may be utilized. For example, both a ranging laser signal and sonar may be used to determine a distance between the AMV and an object.

In addition to scanning for objects, the AMV communicates with other AMVs and/or other objects, such as materials handling facilities, relay locations, etc., as in 1106. For example, as discussed above, a mesh network may be formed by AMV and/or other objects and information (e.g., object locations, weather) shared among AMVs.

A determination is also made as to whether an object has been detected, as in 1108. If it is determined that an object has not been detected, the example process 1100 returns to block 1104 and continues. However, if an object is detected, a distance between the object and the AMV is determined and the relative position of the AMV with respect to the object is determined, as in 1110. Determining the distance between the AMV and the object is discussed above. A determination may also be made as to whether the AMV is in communication with the object, as in 1116. The AMV may be in communication with the detected object if, for example, the object is another AMV, a relay location, a materials handling facility, a delivery location, the AMV management system, and/or another object that transmits ADS-B information. If the AMV is in communication with the object, the object's intent (e.g., direction, speed, position) may be determined based on information received from the object, as in 1118. If it is determined that there is no communication with the object, the objects intent may be inferred, as in 1119. For example, based on continued collection of distance information, it may be determined if the object is stationary with respect to the AMV, moving toward the AMV, moving away from the AMV, etc. An absolute position of the AMV may also be determined, as in 1120. The absolute position of the AMV may be determined using any of the techniques discussed above. As discussed above, the absolute position of the AMV may be determined and used to determine the absolute position of the detected object.

After determining or inferring the object's intent, a determination may be made as to whether the path of the AMV should be adjusted, as in 1122. In some implementations, the path of the AMV may always be adjusted to navigate away from the object. In other implementations, if it is determined that the object is moving away from the AMV or not in a path of the AMV, it may be determined that the path of the AMV does not need to be modified. If it is determined that the AMV's path is to be adjusted, the path of the AMV is adjusted to avoid the object, as in 1124. However, if it is determined that the path of the AMV is not to be adjusted, the example process 1100 returns to block 1104 and continues.

Figure 12:
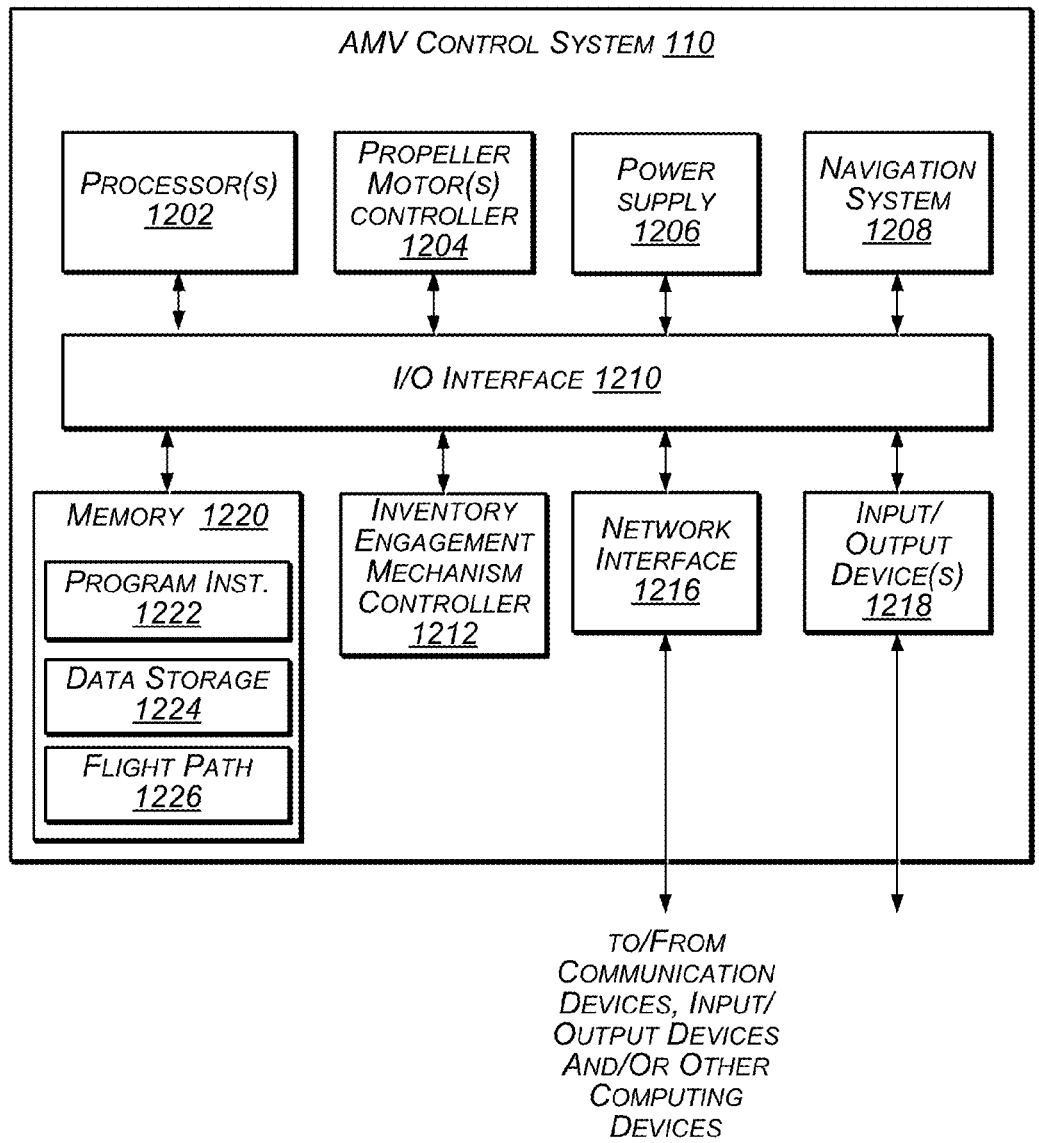
FIG. 12 is a block diagram illustrating various components of an automated mobile vehicle control system, according to an implementation.

FIG. 12 is a block diagram illustrating an example AMV control system 110 of the AMV 100. In various examples, the block diagram may be illustrative of one or more aspects of the AMV control system 110 that may be used to implement the various systems and methods discussed above. In the illustrated implementation, the AMV control system 110 includes one or more processors 1202, coupled to a non-transitory computer readable storage medium 1220 via an input/output (I/O) interface 1210. The AMV control system 110 may also include a propeller motor controller 1204, power supply module 1206 and/or a navigation system 1208. The AMV control system 110 further includes an inventory engagement mechanism controller 1212, a network interface 1216, and one or more input/output devices 1218.

In various implementations, the AMV control system 110 may be a uniprocessor system including one processor 1202, or a multiprocessor system including several processors 1202 (e.g., two, four, eight, or another suitable number). The processor(s) 1202 may be any suitable processor capable of executing instructions. For example, in various implementations, the processor(s) 1202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1202 may commonly, but not necessarily, implement the same ISA.

The non-transitory computer readable storage medium 1220 may be configured to store executable instructions, data, flight paths and/or data items accessible by the processor(s) 1202. In various implementations, the non-transitory computer readable storage medium 1220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1220 as program instructions 1222, data storage 1224 and flight path data 1226, respectively. In other implementations, program instructions, data and/or flight paths may be received, sent or stored upon different types of computer-accessible media, such as non-transitory media, or on similar media separate from the non-transitory computer readable storage medium 1220 or the AMV control system 110. Generally speaking, a non-transitory, computer readable storage medium may include storage media or memory media such as magnetic or optical media, e.g., disk or CD/DVD-ROM, coupled to the AMV control system 110 via the I/O interface 1210. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1216.

In one implementation, the I/O interface 1210 may be configured to coordinate I/O traffic between the processor(s) 1202, the non-transitory computer readable storage medium 1220, and any peripheral devices, the network interface or other peripheral interfaces, such as input/output devices 1218. In some implementations, the I/O interface 1210 may perform any necessary protocol, timing or other data transformations to convert data signals from one component (e.g., non-transitory computer readable storage medium 1220) into a format suitable for use by another component (e.g., processor(s) 1202). In some implementations, the I/O interface 1210 may include support for devices attached through various types of peripheral buses, such as a variant of the Peripheral Component Interconnect (PCI) bus standard or the Universal Serial Bus (USB) standard, for example. In some implementations, the function of the I/O interface 1210 may be split into two or more separate components, such as a north bridge and a south bridge, for example. Also, in some implementations, some or all of the functionality of the I/O interface 1210, such as an interface to the non-transitory computer readable storage medium 1220, may be incorporated directly into the processor(s) 1202.

The propeller motor(s) controller 1204 communicates with the navigation system 1208 and adjusts the power of each propeller motor to guide the AMV along a determined flight path. The navigation system 1208 may include a GPS or other similar system than can be used to navigate the AMV to and/or from a location. The inventory engagement mechanism controller 1212 communicates with the motor(s) (e.g., a servo motor) used to engage and/or disengage inventory. For example, when the AMV is positioned over a level surface at a delivery location, the inventory engagement mechanism controller 1212 may provide an instruction to a motor that controls the inventory engagement mechanism to release the inventory.

The network interface 1216 may be configured to allow data to be exchanged between the AMV control system 110, other devices attached to a network, such as other computer systems, and/or with AMV control systems of other AMVs. For example, the network interface 1216 may enable wireless communication between numerous AMVs. In various implementations, the network interface 1216 may support communication via wireless general data networks, such as a Wi-Fi network. For example, the network interface 1216 may support communication via telecommunications networks such as cellular communication networks, satellite networks, and the like.

Input/output devices 1218 may, in some implementations, include one or more displays, image capture devices, thermal sensors, infrared sensors, time of flight sensors, accelerometers, pressure sensors, weather sensors, etc. Multiple input/output devices 1218 may be present and controlled by the AMV control system 110. One or more of these sensors may be utilized to assist in the landing as well as avoid obstacles during flight.

As shown in FIG. 12, the memory may include program instructions 1222 which may be configured to implement the example processes and/or sub-processes described above. The data storage 1224 may include various data stores for maintaining data items that may be provided for determining flight paths, retrieving inventory, landing, identifying a level surface for disengaging inventory, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the AMV control system 110 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The AMV control system 110 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated AMV control system 110. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from AMV control system 110 may be transmitted to AMV control system 110 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other AMV control system configurations.

Figure 13:
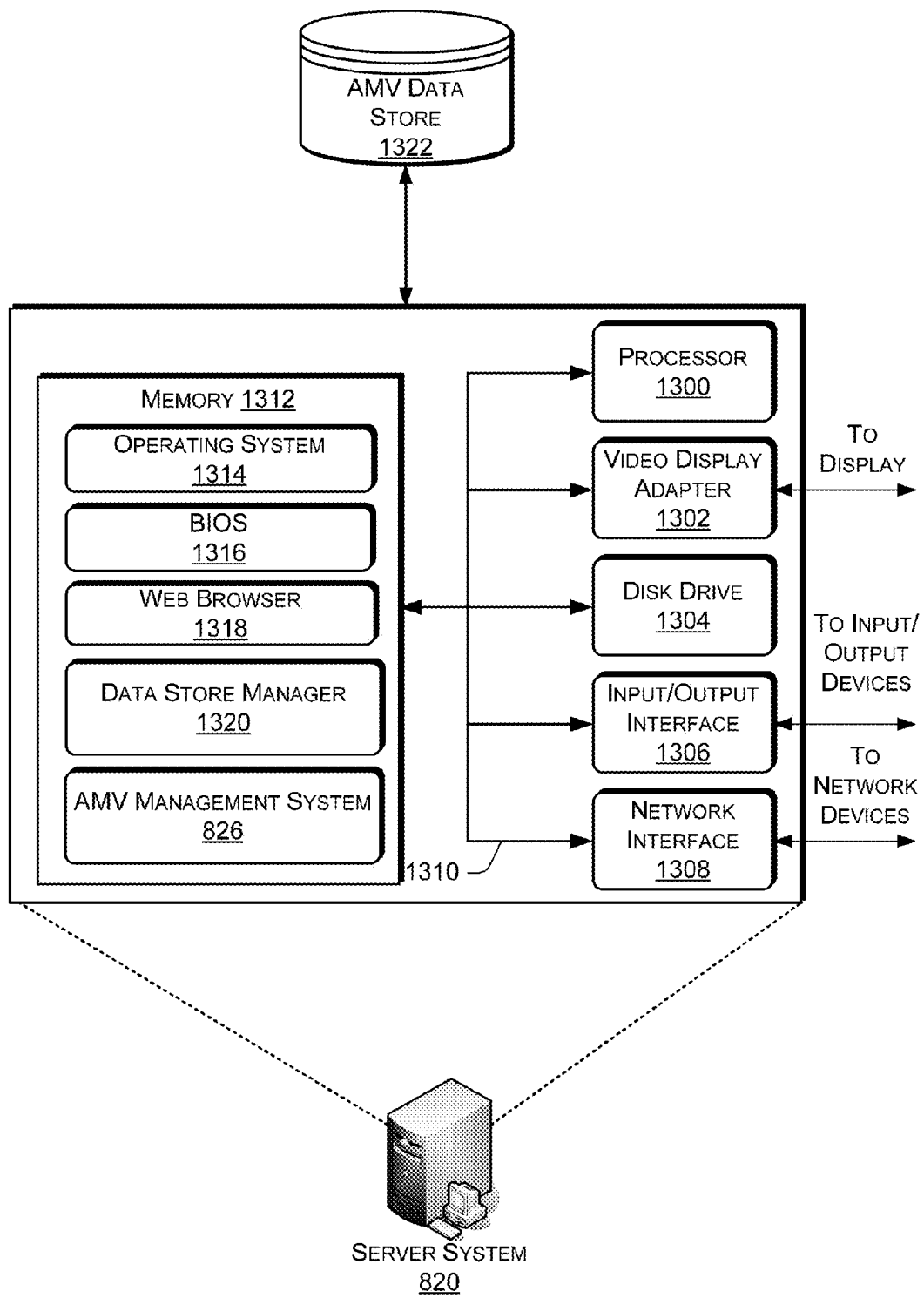
FIG. 13 is a block diagram of an illustrative implementation of a server system that may be used with various implementations.

FIG. 13 is a pictorial diagram of an illustrative implementation of a server system, such as the server system 820, that may be used in the implementations described herein. The server system 820 may include a processor 1300, such as one or more redundant processors, a video display adapter 1302, a disk drive 1304, an input/output interface 1306, a network interface 1308, and a memory 1312. The processor 1300, the video display adapter 1302, the disk drive 1304, the input/output interface 1306, the network interface 1308, and the memory 1312 may be communicatively coupled to each other by a communication bus 1310.

The video display adapter 1302 provides display signals to a local display (not shown in FIG. 13) permitting an operator of the server system 820 to monitor and configure operation of the server system 820. The input/output interface 1306 likewise communicates with external input/output devices not shown in FIG. 13, such as a mouse, keyboard, scanner, or other input and output devices that can be operated by an operator of the server system 820. The network interface 1308 includes hardware, software, or any combination thereof, to communicate with other computing devices. For example, the network interface 1308 may be configured to provide communications between the server system 820 and other computing devices, such as an AMV, materials handling facility, relay location and/or a delivery location, as shown in FIG. 6.

The memory 1312 generally comprises random access memory (RAM), read-only memory (ROM), flash memory, and/or other volatile or permanent memory. The memory 1312 is shown storing an operating system 1314 for controlling the operation of the server system 820. A binary input/output system (BIOS) 1316 for controlling the low-level operation of the server system 820 is also stored in the memory 1312.

The memory 1312 additionally stores program code and data for providing network services to the AMV management system 826. Accordingly, the memory 1312 may store a browser application 1318. The browser application 1318 comprises computer executable instructions that, when executed by the processor 1300, generate or otherwise obtain configurable markup documents such as Web pages. The browser application 1318 communicates with a data store manager application 1320 to facilitate data exchange between the AMV data store 1322 and/or other data stores.

As used herein, the term "data store" refers to any device or combination of devices capable of storing, accessing and retrieving data, which may include any combination and number of data servers, databases, data storage devices and data storage media, in any standard, distributed or clustered environment. The server system 820 can include any appropriate hardware and software for integrating with the AMV data store 1322 as needed to execute aspects of one or more applications for the AMV management system, AMVs, materials handling facilities, delivery locations, and/or relay locations.

The data store 1322 can include several separate data tables, databases or other data storage mechanisms and media for storing data relating to a particular aspect. For example, the data store 1322 illustrated includes AMV information, weather information, flight path information, source location information, destination location information, etc., which can be used to generate and deliver information to the AMV management system 826, materials handling facilities, delivery locations, AMVs, relay locations, and/or users.

It should be understood that there can be many other aspects that may be stored in the AMV data store 1322. The data stores 1322 are operable, through logic associated therewith, to receive instructions from the server system 820 and obtain, update or otherwise process data in response thereto.

The memory 1312 may also include the AMV management system 826, discussed above. The AMV management system 826 may be executable by the processor 1300 to implement one or more of the functions of the server system 820. In one implementation, the AMV management system 826 may represent instructions embodied in one or more software programs stored in the memory 1312. In another implementation, the AMV management system 826 can represent hardware, software instructions, or a combination thereof.

The server system 820, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction in FIG. 13 should be taken as being illustrative in nature and not limiting to the scope of the disclosure.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. An automated vehicle, comprising:
   a body;
   a first motor coupled with the body at a first location, the first motor including:
      a first exterior component having a first cavity and at least one opening on a side of the first exterior component;
      a first interior component positioned substantially within the first cavity of the first exterior component; and
      a first laser based rangefinder positioned substantially within the first cavity of the first exterior component, the first laser based rangefinder configured to emit a first laser signal that projects out of the at least one opening on the side of the first exterior component toward an object, reflects off the object and returns to the first laser based rangefinder through the at least one opening on the side of the first exterior component, and configured to receive the reflected first laser signal and determine a first distance to the object;
   a first propeller coupled to and rotated by the first motor;
   a second motor coupled with the body at a second location, the second motor including:
      a second exterior component having a second cavity and at least one opening on a side of the second exterior component;
      a second interior component positioned substantially within the second cavity of the second exterior component; and
      a second laser based rangefinder positioned substantially within the second cavity of the second exterior component, the second laser based rangefinder configured to emit a second laser signal that projects out of the at least one opening on the side of the second exterior component toward the object, reflects off the object and returns to the second laser based rangefinder through the at least one opening on the side of the second exterior component, and configured to receive the reflected second laser signal and determine a second distance to the object; and
   a second propeller coupled to and rotated by the second motor.

2. The automated vehicle of claim 1, wherein the first laser based rangefinder is coupled to a rotor of the first motor or a drive of the first motor and rotates with the rotor or the drive and emits the first laser signal on a 360 degree plane as the first laser based rangefinder rotates with a rotation of the first motor.

3. An automated vehicle comprising:
   a body;
   a first motor positioned at a first location on the body and at a first angle with respect to the body;
   a first propeller coupled to and rotated by the first motor;
   a first distance determining element coupled to at least a portion of the first motor and rotated with a rotation of the at least a portion of the first motor such that a first laser signal emitted by the first distance determining element forms a first detection pattern about the first motor and along a first plane corresponding to the first angle;
   a second motor positioned at a second location on the body and at a second angle with respect to the body, the second angle being different than the first angle;
   a second propeller coupled to and rotated by the second motor;
   a second distance determining element coupled to at least a portion of the second motor and rotated with a rotation of the at least a portion of the second motor such that a second laser signal emitted by the second distance determining element forms a second detection pattern about the second motor and along a second plane corresponding to the second angle such that the second detection pattern at least partially intersects with the first detection pattern;
   a third motor positioned at a third location on the body and at a third angle with respect to the body, the third angle being different than at least one of the first angle or the second angle;
   a third propeller coupled to and rotated by the third motor; and a third distance determining element coupled to at least a portion of the third motor and rotated with a rotation of the at least a portion of the third motor such that a third laser signal emitted by the third distance determining element forms a third detection pattern about the third motor and along a third plane corresponding to the third angle such that the third detection pattern at least partially intersects with at least one of the first detection pattern or the second detection pattern.

4. The automated vehicle of claim 1, further comprising:
a plurality of reflective surfaces coupled to an exterior surface of the first interior component of the first motor, at least two of the plurality of reflective surfaces positioned at different angles; and
wherein the first laser based rangefinder is coupled to an interior surface of the first exterior component that forms the first cavity and positioned such that the first laser signal emitted from the first laser based rangefinder reflects off at least one of the plurality of reflective surfaces.

5. The automated vehicle of claim 3, further comprising:
a fourth distance determining element coupled to at least a second portion of the first motor and configured to rotate with a rotation of the at least a second portion of the first motor such that a fourth laser signal emitted by the fourth distance determining element forms a fourth detection pattern about the first motor and along a fourth plane corresponding to the first angle.

6. The automated vehicle of claim 1, further comprising:
the first motor including at least one of a brushless motor or a brushed motor.

7. The automated vehicle of claim 5, wherein the second portion of the first motor is at an opposing end of the first motor from the portion of the first motor.

8. The automated vehicle of claim 5, wherein the portion of the first motor and the second portion of the first motor are along a drive or arm of the first motor.

9. The automated vehicle of claim 3, wherein the portion of the first motor is a first rotor.

10. The automated vehicle of claim 3, further comprising:
a positioning component configured to:
receive from each of at least three fixed locations, position information identifying a location of the fixed location; and
determine based at least in part on the received position information, a position of the automated vehicle.

11. The automated vehicle of claim 3, further comprising:
a positioning component configured to:
receive, from the first distance determining element, first distance information indicating a first distance between an object and the first motor;
receive, from the second distance determining element, second distance information indicating a second distance between the object and the second motor;
receive, from the third distance determining element, third distance information indicating a third distance between the object and the third motor; and
determine based at least in part on the received first distance information, second distance information, and third distance information, a position of the automated vehicle with respect to the object.

12. The automated vehicle of claim 3, further comprising:
a receiving component for receiving information from at least one of a second automated vehicle or a transmitter positioned at a fixed location.

13. The automated vehicle of claim 3, further comprising:
a transmitting component for transmitting at least one of a position of the automated vehicle, an intent of the automated vehicle, or a velocity of the automated vehicle.

14. The automated vehicle of claim 3, wherein the first motor and the second motor are separated by approximately 15 centimeters.

* * * * *